(12) United States Patent
Gammel et al.

(10) Patent No.: US 8,250,659 B2
(45) Date of Patent: Aug. 21, 2012

(54) APPARATUS AND METHOD FOR PROTECTING THE INTEGRITY OF DATA

(75) Inventors: Berndt Gammel, Munich (DE); Rainer Goettfert, Taufkirchen (DE)

(73) Assignee: Infineon Technologies AG (DE)

( * ) Notice: Subject to any disclaimer, the term of this patent is extended or adjusted under 35 U.S.C. 154(b) by 1362 days.

(21) Appl. No.: 11/425,103

(22) Filed: Jun. 19, 2006

(65) Prior Publication Data
US 2007/0033417 A1 Feb. 8, 2007

(30) Foreign Application Priority Data

Jun. 17, 2005 (DE) .......................... 10 2005 028 221

(51) Int. Cl.
*G06F 21/00* (2006.01)
(52) U.S. Cl. ................ 726/26; 726/27; 726/28; 726/29; 726/30; 713/150; 713/151; 713/152; 713/153; 713/154; 713/160; 713/161; 713/162; 713/163; 713/164; 713/165; 713/166; 713/167
(58) Field of Classification Search .................... 380/28, 380/36–37, 44–45, 255–283; 713/160–162, 713/189–194; 726/26–30
See application file for complete search history.

(56) References Cited

U.S. PATENT DOCUMENTS

| | | | | |
|---|---|---|---|---|
| 4,569,050 A | * | 2/1986 | Ohme .......................... | 714/775 |
| 5,862,225 A | * | 1/1999 | Feldman et al. .............. | 380/274 |
| 6,445,797 B1 | * | 9/2002 | McGough ..................... | 380/285 |
| 6,970,808 B2 | * | 11/2005 | Abhulimen et al. .......... | 702/185 |
| 7,370,264 B2 | * | 5/2008 | Worley et al. ................ | 714/781 |
| 2002/0158632 A1 | * | 10/2002 | Sodickson .................... | 324/307 |
| 2009/0158045 A1 | * | 6/2009 | Sun et al. ..................... | 713/181 |

OTHER PUBLICATIONS

Chih-Hsu Yen et. al., "Simple Error Detection Methods for Hardware IMplementation of Advanced Encryption Standard", Jun. 2006, IEEE Transactions on computers, vol. 55.*

* cited by examiner

*Primary Examiner* — Taghi Arani
*Assistant Examiner* — Josnel Jeudy
(74) *Attorney, Agent, or Firm* — Dickstein Shapiro LLP

(57) ABSTRACT

By arranging a redundancy means and a control means upstream from an encryption means which encrypts and decrypts the data to be stored in an external memory, the integrity of data may be ensured when the generation of redundancy information is realized by the redundancy means, and when the generation of a syndrome bit vector indicating any alteration of the data is implemented by the control means. What is preferred is a control matrix constructed from idempotent, thinly populated, circulant square sub-matrices only. By arranging redundancy and control means upstream from the encryption/decryption means, what is achieved is that both errors in the encrypted data and errors of the non-encrypted data may be proven, provided that they have occurred in the data path between the redundancy/control means and the encryption/decryption means.

24 Claims, 8 Drawing Sheets

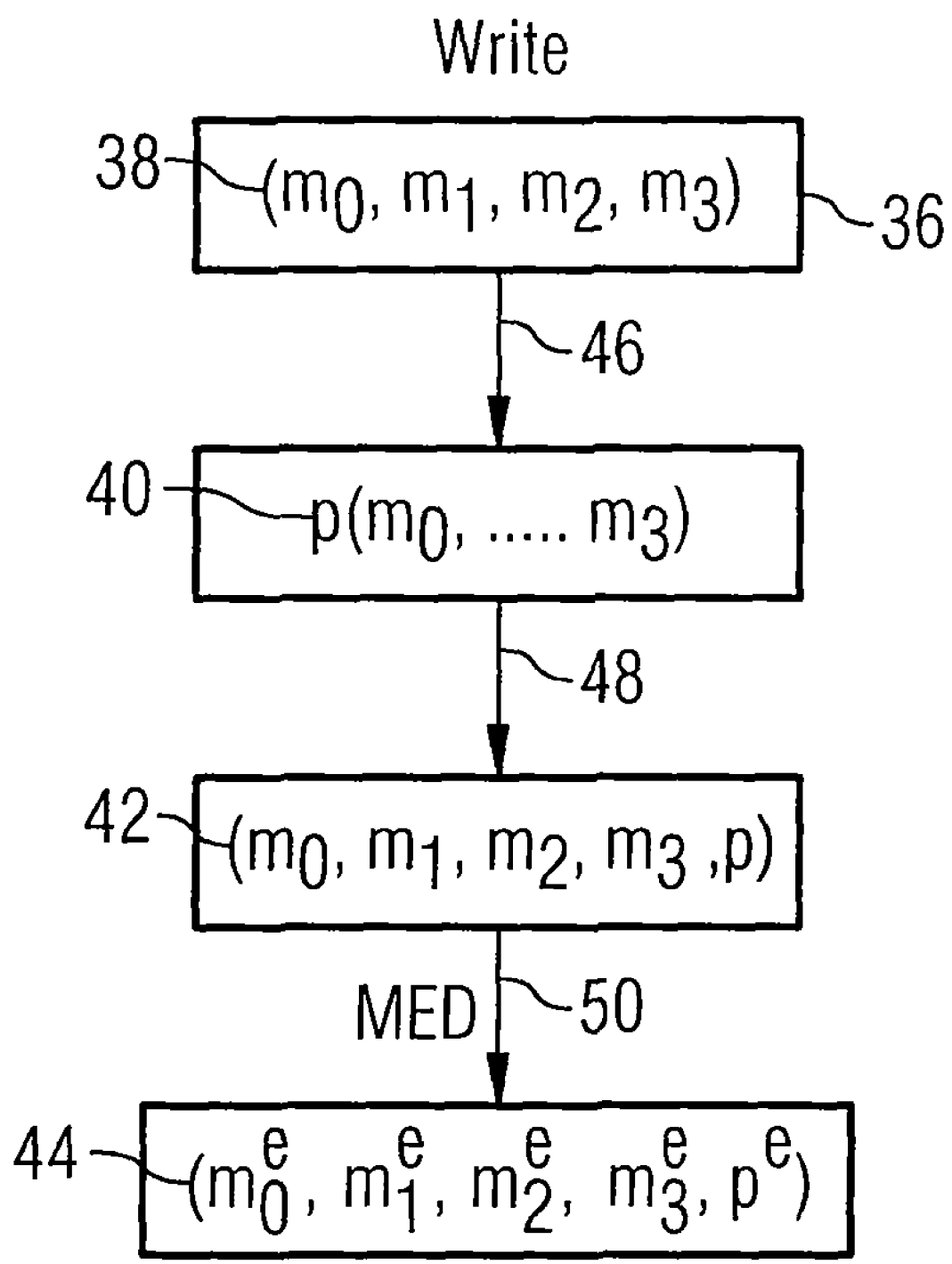

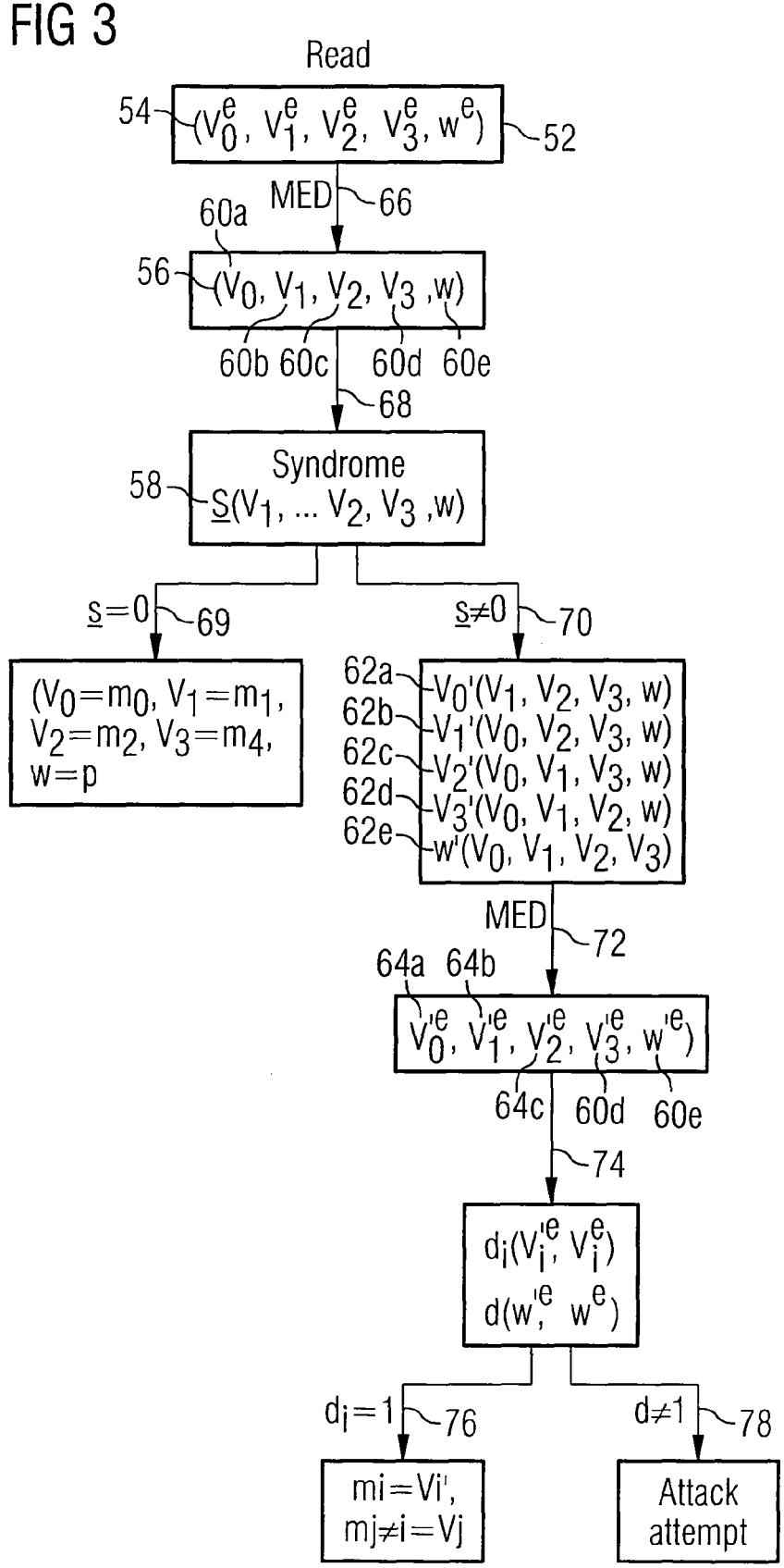

FIG 4A

FIG 4B $$P_4 = \begin{bmatrix}
10000100000000000000100000000000 \\
01000010000000000000010000000000 \\
00100001000000000000001000000000 \\
00010000100000000000000100000000 \\
00001000010000000000000010000000 \\
00000100001000000000000001000000 \\
00000010000100000000000000100000 \\
00000001000010000000000000010000 \\
00000000100001000000000000001000 \\
00000000010000100000000000000100 \\
00000000001000010000000000000010 \\
00000000000100001000000000000001 \\
10000000000010000100000000000000 \\
01000000000001000010000000000000 \\
00100000000000100001000000000000 \\
00010000000000010000100000000000 \\
00001000000000001000010000000000 \\
00000100000000000100001000000000 \\
00000010000000000010000100000000 \\
00000001000000000001000010000000 \\
00000000100000000000100001000000 \\
00000000010000000000010000100000 \\
00000000001000000000001000010000 \\
00000000000100000000000100001000 \\
00000000000010000000000010000100 \\
00000000000001000000000001000010 \\
00000000000000100000000000100001 \\
10000000000000010000000000010000 \\
01000000000000001000000000001000 \\
00100000000000000100000000000100 \\
00010000000000000010000000000010 \\
00001000000000000001000000000001 \\
00000100000000000000100000000000
\end{bmatrix}$$

$$P_5 = \begin{bmatrix}
10000010000000000000001000000000 \\
01000001000000000000000100000000 \\
00100000100000000000000010000000 \\
00010000010000000000000001000000 \\
00001000001000000000000000100000 \\
00000100000100000000000000010000 \\
00000010000010000000000000001000 \\
00000001000001000000000000000100 \\
00000000100000100000000000000010 \\
00000000010000010000000000000001 \\
10000000001000001000000000000000 \\
01000000000100000100000000000000 \\
00100000000010000010000000000000 \\
00010000000001000001000000000000 \\
00001000000000100000100000000000 \\
00000100000000010000010000000000 \\
00000010000000001000001000000000 \\
00000001000000000100000100000000 \\
00000000100000000010000010000000 \\
00000000010000000001000001000000 \\
00000000001000000000100000100000 \\
00000000000100000000010000010000 \\
00000000000010000000001000001000 \\
00000000000001000000000100000100 \\
00000000000000100000000010000010 \\
00000000000000010000000001000001 \\
10000000000000001000000000100000 \\
01000000000000000100000000010000 \\
00100000000000000010000000001000 \\
00010000000000000001000000000100 \\
00001000000000000000100000000010 \\
00000100000000000000010000000001
\end{bmatrix}$$

$$P_6 = \begin{bmatrix}
10000001000000000000000100000000 \\
01000000100000000000000010000000 \\
00100000010000000000000001000000 \\
00010000001000000000000000100000 \\
00001000000100000000000000010000 \\
00000100000010000000000000001000 \\
00000010000001000000000000000100 \\
00000001000000100000000000000010 \\
00000000100000010000000000000001 \\
10000000010000001000000000000000 \\
01000000001000000100000000000000 \\
00100000000100000010000000000000 \\
00010000000010000001000000000000 \\
00001000000001000000100000000000 \\
00000100000000100000010000000000 \\
00000010000000010000001000000000 \\
00000001000000001000000100000000 \\
00000000100000000100000010000000 \\
00000000010000000010000001000000 \\
00000000001000000001000000100000 \\
00000000000100000000100000010000 \\
00000000000010000000010000001000 \\
00000000000001000000001000000100 \\
00000000000000100000000100000010 \\
00000000000000010000000010000001 \\
10000000000000001000000001000000 \\
01000000000000000100000000100000 \\
00100000000000000010000000010000 \\
00010000000000000001000000001000 \\
00001000000000000000100000000100 \\
00000100000000000000010000000010 \\
00000010000000000000001000000001
\end{bmatrix}$$

$$P_7 = \begin{bmatrix}
10000000100000000000000010000000 \\
01000000010000000000000001000000 \\
00100000001000000000000000100000 \\
00010000000100000000000000010000 \\
00001000000010000000000000001000 \\
00000100000001000000000000000100 \\
00000010000000100000000000000010 \\
00000001000000010000000000000001 \\
10000000100000001000000000000000 \\
01000000010000000100000000000000 \\
00100000001000000010000000000000 \\
00010000000100000001000000000000 \\
00001000000010000000100000000000 \\
00000100000001000000010000000000 \\
00000010000000100000001000000000 \\
00000001000000010000000100000000 \\
00000000100000001000000010000000 \\
00000000010000000100000001000000 \\
00000000001000000010000000100000 \\
00000000000100000001000000010000 \\
00000000000010000000100000001000 \\
00000000000001000000010000000100 \\
00000000000000100000001000000010 \\
00000000000000010000000100000001 \\
10000000000000001000000010000000 \\
01000000000000000100000001000000 \\
00100000000000000010000000100000 \\
00010000000000000001000000010000 \\
00001000000000000000100000001000 \\
00000100000000000000010000000100 \\
00000010000000000000001000000010 \\
00000001000000000000000100000001
\end{bmatrix}$$

FIG 4C $P_8 =$ $$\begin{bmatrix} 1000000001000000000000001000000 \\ 0100000000100000000000000100000 \\ 0010000000010000000000000010000 \\ 0001000000001000000000000001000 \\ 0000100000000100000000000000100 \\ 0000010000000010000000000000010 \\ 0000001000000001000000000000001 \\ 1000000100000000100000000000000 \\ 0100000010000000010000000000000 \\ 0010000001000000001000000000000 \\ 0001000000100000000100000000000 \\ 0000100000010000000010000000000 \\ 0000010000001000000001000000000 \\ 0000001000000100000000100000000 \\ 0000000100000010000000010000000 \\ 0000000010000001000000001000000 \\ 0000000001000000100000000100000 \\ 0000000000100000010000000010000 \\ 0000000000010000001000000001000 \\ 0000000000001000000100000000100 \\ 0000000000000100000010000000010 \\ 0000000000000010000001000000001 \\ 1000000000000001000000100000000 \\ 0100000000000000100000010000000 \\ 0010000000000000010000001000000 \\ 0001000000000000001000000100000 \\ 0000100000000000000100000010000 \\ 0000010000000000000010000001000 \\ 0000001000000000000001000000100 \\ 0000000100000000000000100000010 \\ 0000000010000000000000010000001 \end{bmatrix}$$

$P_9 =$ $$\begin{bmatrix} 1000000000100000000000000100000 \\ 0100000000010000000000000010000 \\ 0010000000001000000000000001000 \\ 0001000000000100000000000000100 \\ 0000100000000010000000000000010 \\ 0000010000000001000000000000001 \\ 1000001000000000100000000000000 \\ 0100000100000000010000000000000 \\ 0010000010000000001000000000000 \\ 0001000001000000000100000000000 \\ 0000100000100000000010000000000 \\ 0000010000010000000001000000000 \\ 0000001000001000000000100000000 \\ 0000000100000100000000010000000 \\ 0000000010000010000000001000000 \\ 0000000001000001000000000100000 \\ 0000000000100000100000000010000 \\ 0000000000010000010000000001000 \\ 0000000000001000001000000000100 \\ 0000000000000100000100000000010 \\ 0000000000000010000010000000001 \\ 1000000000000001000001000000000 \\ 0100000000000000100000100000000 \\ 0010000000000000010000010000000 \\ 0001000000000000001000001000000 \\ 0000100000000000000100000100000 \\ 0000010000000000000010000010000 \\ 0000001000000000000001000001000 \\ 0000000100000000000000100000100 \\ 0000000010000000000000010000010 \\ 0000000001000000000000001000001 \end{bmatrix}$$

$P_{10} =$ $$\begin{bmatrix} 1000000000010000000000000010000 \\ 0100000000001000000000000001000 \\ 0010000000000100000000000000100 \\ 0001000000000010000000000000010 \\ 0000100000000001000000000000001 \\ 1000010000000000100000000000000 \\ 0100001000000000010000000000000 \\ 0010000100000000001000000000000 \\ 0001000010000000000100000000000 \\ 0000100001000000000010000000000 \\ 0000010000100000000001000000000 \\ 0000001000010000000000100000000 \\ 0000000100001000000000010000000 \\ 0000000010000100000000001000000 \\ 0000000001000010000000000100000 \\ 0000000000100001000000000010000 \\ 0000000000010000100000000001000 \\ 0000000000001000010000000000100 \\ 0000000000000100001000000000010 \\ 0000000000000010000100000000001 \\ 1000000000000001000010000000000 \\ 0100000000000000100001000000000 \\ 0010000000000000010000100000000 \\ 0001000000000000001000010000000 \\ 0000100000000000000100001000000 \\ 0000010000000000000010000100000 \\ 0000001000000000000001000010000 \\ 0000000100000000000000100001000 \\ 0000000010000000000000010000100 \\ 0000000001000000000000001000010 \\ 0000000000100000000000000100001 \end{bmatrix}$$

$P_{11} =$ $$\begin{bmatrix} 1000000000001000000000000001000 \\ 0100000000000100000000000000100 \\ 0010000000000010000000000000010 \\ 0001000000000001000000000000001 \\ 1000100000000000100000000000000 \\ 0100010000000000010000000000000 \\ 0010001000000000001000000000000 \\ 0001000100000000000100000000000 \\ 0000100010000000000010000000000 \\ 0000010001000000000001000000000 \\ 0000001000100000000000100000000 \\ 0000000100010000000000010000000 \\ 0000000010001000000000001000000 \\ 0000000001000100000000000100000 \\ 0000000000100010000000000010000 \\ 0000000000010001000000000001000 \\ 0000000000001000100000000000100 \\ 0000000000000100010000000000010 \\ 0000000000000010001000000000001 \\ 1000000000000001000100000000000 \\ 0100000000000000100010000000000 \\ 0010000000000000010001000000000 \\ 0001000000000000001000100000000 \\ 0000100000000000000100010000000 \\ 0000010000000000000010001000000 \\ 0000001000000000000001000100000 \\ 0000000100000000000000100010000 \\ 0000000010000000000000010001000 \\ 0000000001000000000000001000100 \\ 0000000000100000000000000100010 \\ 0000000000010000000000000010001 \end{bmatrix}$$

FIG 4D $$P_{12} = \begin{pmatrix}
1000000000000100000000000000100 \\
0100000000000010000000000000010 \\
0010000000000001000000000000001 \\
1001000000000000100000000000000 \\
0100100000000000010000000000000 \\
0010010000000000001000000000000 \\
0001001000000000000100000000000 \\
0000100100000000000010000000000 \\
0000010010000000000001000000000 \\
0000001001000000000000100000000 \\
0000000100100000000000010000000 \\
0000000010010000000000001000000 \\
0000000001001000000000000100000 \\
0000000000100100000000000010000 \\
0000000000010010000000000001000 \\
0000000000001001000000000000100 \\
0000000000000100100000000000010 \\
0000000000000010010000000000001 \\
1000000000000001001000000000000 \\
0100000000000000100100000000000 \\
0010000000000000010010000000000 \\
0001000000000000001001000000000 \\
0000100000000000000100100000000 \\
0000010000000000000010010000000 \\
0000001000000000000001001000000 \\
0000000100000000000000100100000 \\
0000000010000000000000010010000 \\
0000000001000000000000001001000 \\
0000000000100000000000000100100 \\
0000000000010000000000000010010 \\
0000000000001000000000000001001
\end{pmatrix}$$

$$P_{13} = \begin{pmatrix}
1000000000000100000000000000010 \\
0100000000000010000000000000001 \\
1010000000000001000000000000000 \\
0101000000000000100000000000000 \\
0010100000000000010000000000000 \\
0001010000000000001000000000000 \\
0000101000000000000100000000000 \\
0000010100000000000010000000000 \\
0000001010000000000001000000000 \\
0000000101000000000000100000000 \\
0000000010100000000000010000000 \\
0000000001010000000000001000000 \\
0000000000101000000000000100000 \\
0000000000010100000000000010000 \\
0000000000001010000000000001000 \\
0000000000000101000000000000100 \\
0000000000000010100000000000010 \\
0000000000000001010000000000001 \\
1000000000000000101000000000000 \\
0100000000000000010100000000000 \\
0010000000000000001010000000000 \\
0001000000000000000101000000000 \\
0000100000000000000010100000000 \\
0000010000000000000001010000000 \\
0000001000000000000000101000000 \\
0000000100000000000000010100000 \\
0000000010000000000000001010000 \\
0000000001000000000000000101000 \\
0000000000100000000000000010100 \\
0000000000010000000000000001010 \\
0000000000001000000000000000101
\end{pmatrix}$$

$$P_{14} = \begin{pmatrix}
1000000000000010000000000000001 \\
1100000000000001000000000000000 \\
0110000000000000100000000000000 \\
0011000000000000010000000000000 \\
0001100000000000001000000000000 \\
0000110000000000000100000000000 \\
0000011000000000000010000000000 \\
0000001100000000000001000000000 \\
0000000110000000000000100000000 \\
0000000011000000000000010000000 \\
0000000001100000000000001000000 \\
0000000000110000000000000100000 \\
0000000000011000000000000010000 \\
0000000000001100000000000001000 \\
0000000000000110000000000000100 \\
0000000000000011000000000000010 \\
0000000000000001100000000000001 \\
1000000000000000110000000000000 \\
0100000000000000011000000000000 \\
0010000000000000001100000000000 \\
0001000000000000000110000000000 \\
0000100000000000000011000000000 \\
0000010000000000000001100000000 \\
0000001000000000000000110000000 \\
0000000100000000000000011000000 \\
0000000010000000000000001100000 \\
0000000001000000000000000110000 \\
0000000000100000000000000011000 \\
0000000000010000000000000001100 \\
0000000000001000000000000000110 \\
0000000000000100000000000000011
\end{pmatrix}$$

APPARATUS AND METHOD FOR PROTECTING THE INTEGRITY OF DATA

CROSS-REFERENCE TO RELATED APPLICATION

This application claims priority from German Patent Application No. 102005028221.0, which was filed on Jun. 17, 2005, and is incorporated herein by reference in its entirety.

BACKGROUND OF THE INVENTION

1. Field of the Invention

The present invention relates to an apparatus and a method for protecting the integrity of data, such as may be applied in processing and storing data by means of, for example, a microcontroller.

2. Description of Prior Art

It is desirable, in many application scenarios, to protect stored data from being accessed by unauthorized persons, which is why they are stored in a memory in an encrypted form. Here, the data may be altered, during their transfer via a bus system or during their dwell time in the memory, due to randomly occurring errors, or faults, e.g. an individual bit being toggled. An attacker who wants to compromise the security of a system by means of fault attacks will deliberately alter data stored, more than one bit of a data packet which is stored or transmitted via a bus being altered in fault attacks in most cases. In addition to encrypting the data stored, what is also required therefore is an apparatus which may recognize any alteration of the data which is caused at random or deliberately.

To generally recognize attacks on a system, sensors are used in some places. These sensors may be, for example, voltage-measuring instruments for recognizing overvoltages which are deliberately fed into a system. In addition, temperature and light sensors are used for recognizing, for example, a housing being opened or ground open.

Another possibility of protection is to provide data words with redundancy information before they are stored, the redundancy information allowing the detection of the alteration of bits of a data word digitally stored, and, depending on the property of the redundancy information, allowing the alteration to be corrected. Here, the redundancy information is typically attached to the data after it has been encrypted, so as to recognize an alteration of the encrypted data in an external memory area. The German patent application 10 2005 001953.6 additionally describes a method for verifying a data set consisting of several data words, wherein a redundancy data word is formed by "XORing" all data words prior to encrypting, the data set being encrypted word for word and being stored after the redundancy formation.

The detection of an attack by means of sensors does not enable a "saturation", or comprehensive, detection of a fault attack, and gives rise to considerably higher cost than, for example, a purely digital circuit. Saturation here means that the entire data path cannot be monitored with physical sensors from the moment of data generation. Adding the redundancy information after the data has been encrypted has the great advantage that, in this way, only errors which occur in the external memory can be proven. Data errors which occur—at random or due to an attack—in the data between the calculating unit and the encryption unit, cannot be recognized. XORing the data prior to encryption has the disadvantage that, due to the mathematical simplicity of the XOR operation, attacks may be discovered only if an odd number of data bits of the data set have been altered by the attack.

SUMMARY OF THE INVENTION

It is an object of the present invention to provide an apparatus and a method by means of which the alteration of data prior to encryption, and the alteration of encrypted data may be proven.

In accordance with a first aspect, the invention provides an apparatus for protecting the integrity of data, having:

a redundancy generator for forming a data bit vector from a plurality of data words of a data block, and for generating a control bit vector by multiplying the data bit vector by a binary generator matrix;

an encryptor/decryptor for encrypting each of the data words to obtain encrypted data words, and for encrypting the control bit vector to obtain an encrypted control bit vector, and for decrypting each of the encrypted data words to obtain decrypted data words, and for decrypting the encrypted control bit vector to obtain a decrypted control bit vector;

a controller for forming an overall bit vector from the decrypted data words or from the decrypted data words and the decrypted control bit vector, and for creating a syndrome bit vector by multiplying a binary control matrix by the overall bit vector, so that the integrity of the overall bit vector is verifiable using the syndrome bit vector.

In accordance with a second aspect, the invention provides an apparatus for protecting the integrity of data, having:

a decryptor for decrypting encrypted data words to obtain decrypted data words, and for decrypting an encrypted control bit vector to obtain a decrypted control bit vector; and a controller for forming an overall bit vector from the decrypted data words or from the decrypted data words and the decrypted control bit vector, and for creating a syndrome bit vector by multiplying a binary control matrix by the overall bit vector, so that the integrity of the overall bit vector is verifiable using the syndrome bit vector.

In accordance with a third aspect, the invention provides an apparatus for protecting the integrity of data, having:

a redundancy generator for forming a data bit vector from a plurality of data words of a data block, and for generating a control bit vector by multiplying the data bit vector by a binary generator matrix;

an encryptor for encrypting each of the data words to obtain encrypted data words, and for encrypting the control bit vector to obtain an encrypted control bit vector.

In accordance with a fourth aspect, the invention provides an apparatus for protecting the integrity of data, having:

a redundancy generator for forming a data bit vector from a plurality of data words of a data block, and for generating a control bit vector by multiplying the data bit vector by a binary generator matrix;

an encryptor/decryptor for encrypting each of the data words to obtain encrypted data words, and for encrypting the control bit vector to obtain an encrypted control bit vector, and for decrypting each of the encrypted data words to obtain decrypted data words, and for decrypting the encrypted control bit vector to obtain a decrypted control bit vector;

a controller for forming an overall bit vector from the decrypted data words or from the decrypted data words and the decrypted control bit vector, and for creating a syndrome bit vector by multiplying a binary control matrix by the overall bit vector, so that the integrity of the overall bit vector is verifiable using the syndrome bit vector, wherein the redundancy generator is configured to generate, in a following data bit vector which differs from the data bit vector by one difference vector, a difference control bit word by multiplying the difference vector by the generator matrix, and to form a following control bit word from the sum of the control bit word and the difference control bit word.

In accordance with a fifth aspect, the invention provides an apparatus for protecting the integrity of data, having:

a redundancy generator for forming a data bit vector from a plurality of data words of a data block, and for generating a control bit vector by multiplying the data bit vector by a binary generator matrix;

an encryptor for encrypting each of the data words to obtain encrypted data words, and for encrypting the control bit vector to obtain an encrypted control bit vector, wherein the redundancy generator is configured to generate, in a following data bit vector which differs from the data bit vector by one difference vector, a difference control bit word by multiplying the difference vector by the generator matrix, and to form a following control bit word from the sum of the control bit word and the difference control bit word.

In accordance with a sixth aspect, the invention provides a method for protecting the integrity of data, the method including the steps of: decrypting encrypted data words to obtain decrypted data words, and decrypting an encrypted control bit vector to obtain a decrypted control bit vector;

forming an overall bit vector from the decrypted data words and the decrypted control bit vector; and multiplying a binary control matrix by the overall bit vector to create a syndrome bit vector, so that the integrity of the data words is verifiable using the syndrome bit vector.

In accordance with a seventh aspect, the invention provides a method for protecting the integrity of data, the method including the steps of:

forming a data bit vector from a plurality of data words of a data block;

multiplying the data bit vector by a binary generator matrix to generate a control bit vector; and encrypting each of the data words to obtain encrypted data words, and encrypting the control bit vector to obtain an encrypted control bit vector.

In accordance with an eighth aspect, the invention provides a computer program having a program code for performing the method for protecting the integrity of data, the method including the steps of:

decrypting encrypted data words to obtain decrypted data words, and decrypting an encrypted control bit vector to obtain a decrypted control bit vector;

forming an overall bit vector from the decrypted data words and the decrypted control bit vector; and multiplying a binary control matrix by the overall bit vector to create a syndrome bit vector, so that the integrity of the data words is verifiable using the syndrome bit vector, when the program runs on a computer.

In accordance with a ninth aspect, the invention provides a computer program having a program code for performing the method for protecting the integrity of data, the method including the steps of:

forming a data bit vector from a plurality of data words of a data block;

multiplying the data bit vector by a binary generator matrix to generate a control bit vector; and encrypting each of the data words to obtain encrypted data words, and encrypting the control bit vector to obtain an encrypted control bit vector, when the program runs on a computer.

The core idea of the present invention is that by arranging a redundancy means and a control means upstream from an encryption means, which encrypts and decrypts data to be stored in an external memory, the integrity of data may be ensured if the generation of redundancy information by the redundancy means, and the generation of a syndrome bit vector indicating any alteration of the data is implemented by the control means. What is preferred is a control matrix constructed from idempotent, thinly populated, circulant square sub-matrices only. What is achieved by arranging redundancy and control means upstream from the encryption/decryption means is that both errors in the encrypted data and in the non-encrypted data may be proven as long as they have occurred in the data path between the redundancy/control means and the encryption/decryption means. The specially designed control matrix of idempotent, thinly populated, circulant square sub-matrices, which represents a preferably linear code for protection against fault attacks, further allows to implement a means and/or the method in a computer hardware, in which case only a small silicon area being required, and the current consumption of the implementation being very small.

In a specific embodiment of the present invention, the redundancy and control means are arranged within the same computer chip as the data processor, the data words to be stored being provided with the redundancy information immediately after they have been generated by the data processor. Prior to being stored in an external memory, the data is carried, via registers and latches, to an encryption unit which encrypts the data and stores the encrypted data in the external memory. This arrangement has the major advantage that the data of the data processor is protected by the system during the entire journey, so that any alteration of data and/or an attack on the system both prior to encrypting the data and after encrypting the data may be proven.

In a further embodiment of the present invention, the redundancy means is configured such that the generation of the redundancy information for several data words of a data block, which belong together, includes a matrix multiplication of a generator matrix by a data bit vector formed from the individual bits of the data words. The generator matrix is selected such that a second piece of redundancy information of a second data bit vector may be formed in a simple manner when the second data bit vector differs from the preceding first data bit vector by one difference bit vector. The second piece of redundancy information may then be formed from the first piece of redundancy information, when the difference bit vector is multiplied by the generator matrix and when the resulting difference redundancy bit vector is added with the first redundancy bit vector. If two successive data bit vectors differ by only a few bits, considerable energy saving may be achieved, due to this property of the matrix, when the redundancy generation is implemented in hardware, since it is only the few changing bits which need to be subjected to a multiplication operation.

In a further embodiment of the present invention, the data read from an external memory is checked for its integrity once it has been decrypted by a decryption unit. A syndrome bit vector is generated by the redundancy means by means of multiplying a suitable control matrix by the data decrypted. If this syndrome bit vector is the zero vector, what is concluded therefrom is that the data has been altered neither during storing nor by the encrypting/decrypting. The data read is thus assumed to be non-manipulated. If the syndrome bit vector differs from the zero vector, an error of a bit in the data may always be corrected due to the fact that the redundancy information was added to the data prior to encryption. This is a major advantage, since encrypting the data is a highly nonlinear operation, so that an encrypted data word which is altered at one single bit position only, will yield, after decryption, a data word which differs from the original data word at several bit positions. The inventive apparatus even provides the possibility, in particular, of differentiating between whether the data has been altered by a random 1-bit error or whether it has been altered at several bit positions by an attack on the system.

In a further specific embodiment of the present invention, each message block, consisting of four 32-bits words, is equipped with additional information (a control word) calculated from the message block, the associated control word also being 32 bits in length. The integrity of the data is verified in that the syndrome is calculated from the four message words and from the control word. The syndrome is then a further 32-bits word. If no error has occurred, the syndrome is the zero word (or the zero vector consisting of 32 zeros). Conversely, the fact "syndrome=zero vector" is interpreted to mean that no error has occurred. The probability of this inverse conclusion being correct is $1-1/2^{32}$, provided that any error could occur (any number of the total of 160 bits were altered in the fault attack). In certain attack scenarios, however, such as with limited errors generated during the transfer of the message via a bus due to light, laser or spike attacks, or with errors caused by forcing an individual bus line, the inverse conclusion is absolutely correct. This means that such attacks will always be recognized. The advantage of the present invention is that an attack on a system may be proven with absolute certainty, the inventive configuration of the redundancy and control means for processing 32 bit words providing the possibility of integrating the apparatus for protecting the integrity of data into an existing 32-bits processor architecture without any problems.

BRIEF DESCRIPTION OF THE DRAWINGS

These and other objects and features of the present invention will become clear from the following description taken in conjunction with the accompanying drawing, in which:

FIG. 2 is a state diagram describing the states of data words in the writing operation;

FIG. 3 is a state diagram describing the states of data words during the reading operation;

Figure 4A:
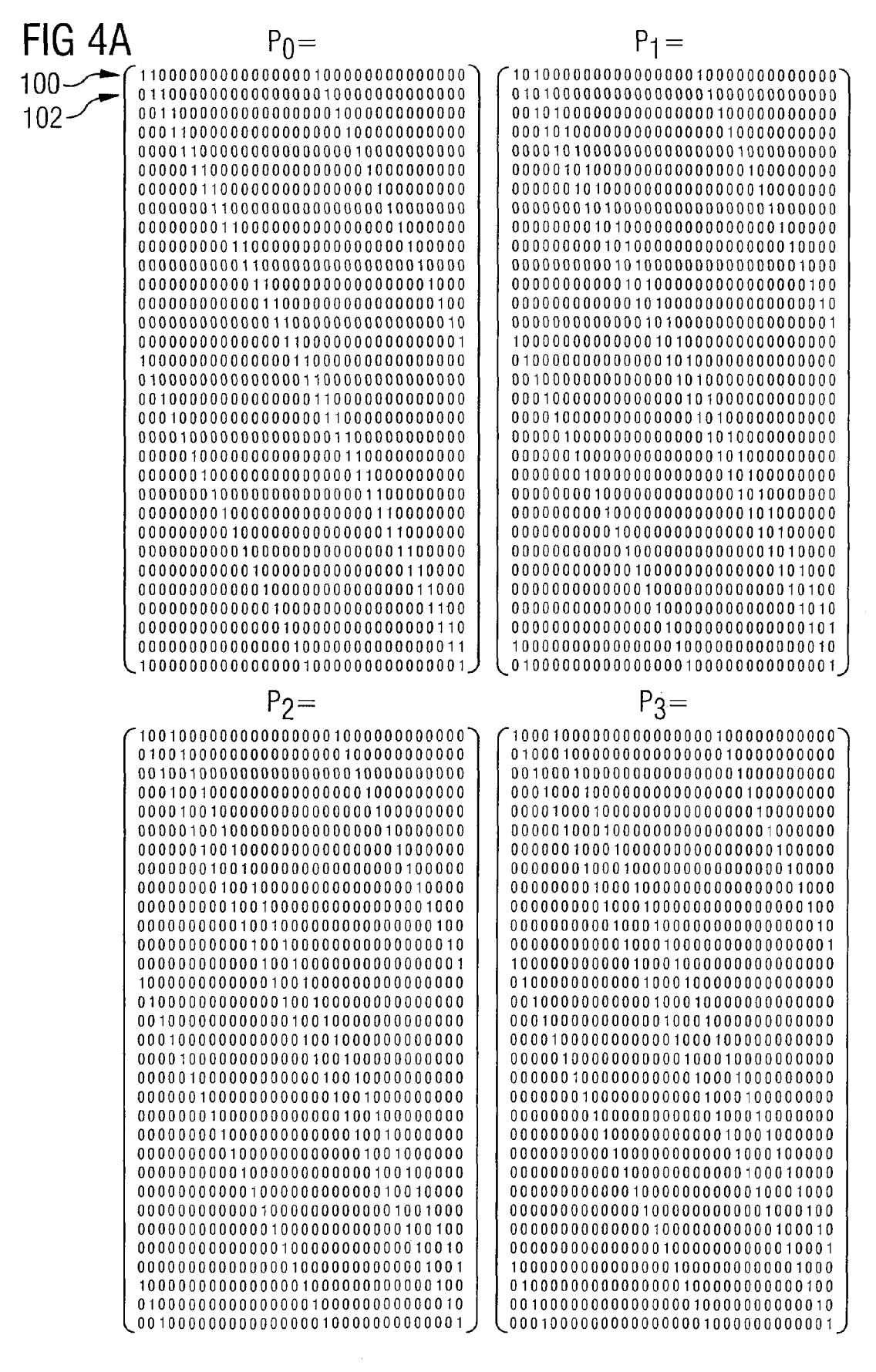

FIGS. 4a-d are representations of idempotent, thinly populated, circulant square matrices;

DESCRIPTION OF PREFERRED EMBODIMENTS

Figure 1:
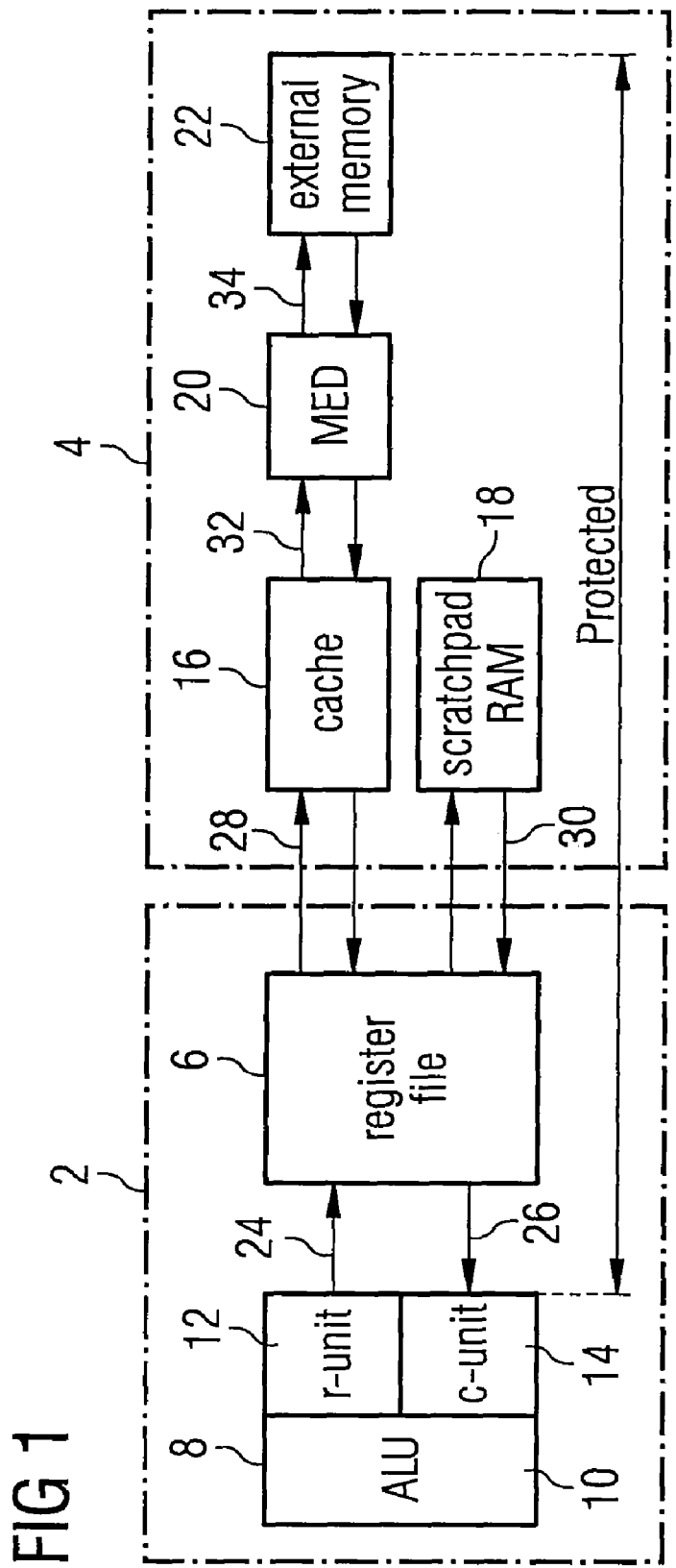
FIG. 1 is an apparatus for protecting the integrity of data.

FIG. 1 is a schematic representation of an inventive apparatus for protecting the integrity of data. What is shown are a main processor 2 and a memory system 4. The main processor includes a data register 6 for sending and receiving data words, a central processor 8 consisting of a calculating unit 10, a redundancy unit 12 and a control unit 14. The memory system 4 includes a fast temporary memory 16, the so-called cache, an internal memory 18, an encryption/decryption unit 20 and a mass memory 22. The redundancy unit 12 is connected to the data register 6 by a first data connection 24 for sending data words to the data register. Data register 6 is connected to control unit 14 via a second data connection 26 so as to send data words from data register 6 to control unit 14. Data register 6 is connected to cache 16 via a first bi-directional data connection 28 so as to be able to exchange data words between data register 6 and cache 16. For the same purpose, data register 6 is connected to the internal memory 18 via a second bi-directional data connection 30. Via a third bi-directional data connection 32, cache 16 is connected to encryption/decryption unit 20, which, in turn, is connected to mass memory 22 via a fourth bi-directional data connection 34.

What follows is a brief explanation of the mode of operation of the embodiment in FIG. 1; for the detailed description of the process steps performed on the data words which are to be transmitted during reading and writing, please refer to the state diagrams in FIGS. 2 and 3.

The data words calculated by the calculating unit 10 are linked by redundancy unit 12 with a redundancy data word calculated by redundancy unit 12, so that the data words and the redundancy data word are transmitted into data register 6 via the first data connection 24. Data register 6 may transmit the data words and the redundancy data word, in dependence on the storage duration required, into internal memory 18 via bi-directional data connection 30, on the one hand, and into cache 16 via bi-directional data connection 28, on the other hand. The data words and the redundancy data word are transmitted, via bi-directional data connection 32, from cache 16 into encryption/decryption unit 20, where they are converted into encrypted data words and into an encrypted redundancy data word by encryption/decryption unit 20, wherein each of the data words is transformed separately into an encrypted data word. The data words encrypted and the redundancy data word encrypted are then transmitted into the mass memory via bi-directional data connection 34, and stored therein.

During the reading operation, the data words encrypted and the redundancy data word encrypted are jointly transmitted from mass memory 22 to encryption/decryption unit 20 via bi-directional data connection 34, and are decrypted word for word there. The data words decrypted and the redundancy data word decrypted are transmitted, via bi-directional data connection 32, to cache 16, from where they are transmitted into data register 6 via bi-directional data connection 28. From data register 6, the data words decrypted and the redundancy data word decrypted are transmitted, via data connection 26, to control unit 16 which calculates a syndrome bit vector from the data words and the redundancy data word, by means of which syndrome bit vector a decision may be made as to whether the data words have been altered during their journey through the memory system 4.

The processes occurring during storage of the data will be explained in more detail below in the state diagram in FIG. 2 with reference to FIG. 1. FIG. 2 represents a non-encrypted data set 36 which consists of data words $m_0$ to $m_3$, the data words $m_0$ to $m_3$ being 32-bits words in each case, i.e. which may be represented as a vector of 32 successive bits. Data set 36 is represented by a data bit vector 38 which is formed by successively arranging the 32 bits of the individual data words $m_0$ to $m_3$, respectively, in a vector. Also shown are a control bit vector 40, an overall bit vector 42 and an encrypted overall bit vector 44. During the writing operation, the data words are calculated by calculating unit 10 and are transmitted to redundancy unit 12 as a data bit vector 38. Redundancy unit 12 generates control bit vector 40 by multiplying the data bit vector 38 by a generator matrix in a redundancy formation step 46. During the overall bit vector generation 48, the redundancy unit 12 joins the control bit vector 40 and the data bit vector 38 in the overall bit vector 42, for which purpose the control bit vector 40 is the last 32 bits of the overall bit vector 42 to be added to the data bit vector 38. During the encryption step 50, overall bit vector 42 is transmitted, via data register 6 and cache 16, to encryption/decryption unit 20, where said overall bit vector 42 is encrypted word by word, so that at the output of the encryption/decryption unit 20, the encrypted overall bit vector 44 is available, which will be stored in an external memory 22. Since the encryption is conducted word by word, the encrypted overall bit vector 44 consists of the bit representations, lined up one after the other, of the encrypted words $m_0$ to $m_3$ and of the encrypted control bit vector.

The individual states of the data words of a data set read out from mass memory 22 will be explained below in more detail with reference to FIG. 3, mention also being made of how an alteration of the stored data, which may be proven, may be corrected. FIG. 3 shows an encrypted, stored data set 52 represented by an encrypted overall bit vector 54, a decrypted overall bit vector 56, a syndrome bit vector 58, decrypted data word vectors 60a-60e, substituted data word vectors 62a-62e, and encrypted substituted data word vectors 64a-64e. Mass memory 22 has the encrypted overall bit vector 54 stored therein, which is decrypted word for word by the encryption/decryption unit 20 in a decryption step 66, so that after the decryption, the decrypted overall bit vector 56 is available, which consists of the decrypted data word vectors 60a-60e and which is transmitted, in a reading transfer step 68, from encryption/decryption unit 20 to control unit 14 via cache 16 and data register 6. By multiplying the decrypted overall bit vector 56 by a binary control matrix, control unit 14 forms, from the decrypted overall bit vector 56, a syndrome bit vector 58 by means of which the integrity of the decrypted overall bit vector 56 may be verified. If the syndrome bit vector 58 is the zero vector, i.e. if all its 32 bits equal 0, what is inferred in a confirmation step 69 is that the data has neither been altered in the mass memory 22 nor during the reading transfer step 68, and it is assumed that the decrypted overall bit vector 56 corresponds to the overall bit vector 42 creation during the writing operation.

If the syndrome bit vector does not equal the zero vector, the data has been altered since the creation of the control bit vector during the writing operation. What is initially assumed here is that a bit of one of the data words has accidentally changed during the dwell time of the data in the mass memory 22. By means of the highly non-linear decryption operation of the encryption/decryption unit 20 during the decryption step 66, an individual altered bit will reveal itself, prior to the decryption of a data word vector, in a plurality of altered bits of a decrypted data word vector, i.e. such a decrypted data word vector differs from its underlying data bit vector in a plurality of bits. By means of the inventive apparatus, it is now nevertheless possible to recognize a one-bit error in one of the encrypted data word vectors and to correct same. This is possible because of the redundancy information that was added to the non-encrypted data set during writing, as will be described below.

If the syndrome bit vector 58 does not equal the zero vector, substituted data word vectors 62a-62e are initially formed, in a substitution step 70, by the control unit 14, the substituted data word vectors 62a-62e being formed in dependence on the decrypted data word vectors 60a-60e, which is possible due to the additional redundancy information. As a consequence of our assumption stating that only one individual one of the data words of the encrypted overall bit vector 54 is affected by a bit error, there will then be precisely one substituted data word vector 62a-62e, which depends only on the 4 data words, which have been decrypted in an error-free manner, of data word vectors 60a-60e.

In a verification step 72, the substituted data word vectors 62a-62e are encrypted word for word by encryption/decryption unit 20, so that the encrypted, substituted data word vectors 64a-64e result. In a comparison step 74, the control unit 14 forms the Hamming distances of the encrypted substituted data word vectors 64a-64e from the data words, associated with same, of the encrypted overall bit vector 54. If an error in a data word of the encrypted overall bit vector 54 has been caused by an individual bit error, the Hamming distance of the data word concerned from its encrypted substituted partner will be precisely 1, and the decrypted overall bit vector 56 may be reconstructed in a completely error-free manner in a reconstruction step 76. If none of the data words of the encrypted data set 52 has a Hamming distance of 1 from its encrypted substituted data word vector associated with it, it will be assumed, in an error step 78, that more than 1 bit of the encrypted data set 52 has been altered by an attack, so that suitable measures may be taken to address the attack.

In a further specific embodiment of the present invention, a linear code for protection against fault attacks is defined and/or implemented by a specifically designed control matrix. What follows is a brief presentation of the fundamental considerations required for designing the inventive apparatus for protecting the integrity of data. The basic prerequisite for developing an error detection (EDC) or an error correction code (ECC) for a system is the adoption of a fault model. The fault model is a mathematical abstraction of potential errors. In the present case, the fault model must take into account the effects of potential attacks on the system. Since a microcontroller is an extremely complicated system, the system is initially subdivided into small sub-systems, the behaviors of which are easier to model. At the end of the considerations, a general fault model of the entire system must again be synthesized from the individual functional blocks of the sub-systems. The present embodiment contemplates a data register 6 located in a data path, a cache 16, an internal memory 18, an encryption/decryption unit 20, and a mass memory 22, as may be seen in FIG. 1.

The assumptions with regard to the attack scenario which are made for the purpose of developing the present invention will be briefly set forth below.

There are many types of attack of a local character, i.e. wherein the attacker has the possibility of altering individual bits. A professional attacker might have the possibility of altering individual bits in a controlled manner (by using, for example, a focused laser beam) or of using micro-samples. Other types of attack randomly alter individual bits or bit groups. If the attacker uses, for example, ionizing radiation in connection with an aperture device so as to select individual bit groups, he/she will be in a position to alter individual bit groups at random. An adjustment of the radiation intensity might even make it possible to refine the attack to the effect that the weight of an error vector is maximized. Here, the error vector is a vector of binary numbers which exhibits a 1 at the positions of the altered bits, and exhibits a 0 at the remaining positions. Short-lived electrical overvoltages or attacks with intense local overheating (e.g. temperature-induced voltage changes) may lead to random bit errors. Less sophisticated (nonetheless very efficient) attacks such as irradiation of a system with light (flash light attacks) or overclocking a circuit may lead to "burst" errors, i.e. a relatively large number of bits are placed into the same logic state, i.e. 1 or 0. Even though there is no well-founded understanding regarding the characteristics or the circumstances that lead to burst errors, there are, however, several indications that in many such attacks there is a higher probability that neighboring bits switch to the same state. Therefore, for future contemplations, we shall assume the worst conceivable case where all errors having weights from 1 to 160 are equally probable, i.e. that after an attack, any bit combination of data bit vector of the length of 160 bits has an equal probability of occurring.

On the basis of this assumption, the security requirements for efficient error detection and error correction will be briefly discussed below. Initially it shall be assumed that an attacker performs an automated attack, where he/she may perform 10 fault attacks per second and allows the attacks to proceed continually over a period of one month, which results in an overall number of $$10*30*24*3600 = 2{,}59*10^7 < 2^{25}$$

attacks. The probability that an individual attack is not detected is $1:2^{32}$. Thus, the probability that an attack will not be discovered within one whole month becomes less that 1% when the above-described attack scenario is contemplated.

A short overview of several possibilities of implementing an error correction method shall be given below. Initially, the linear error codes are to be contemplated in detail. With a systematic code, k information bits $a_1 a_2 \ldots a_k$ are enriched by means of n−k control or check bits $a_{k+1} a_{k+2} \ldots a_n$ so as to form a code word $c = a_1 a_2 \ldots a_n$ of a length of n. Thus, $$c = \underbrace{a_1 a_2 a_3 \ldots a_k}_{\text{Information bits}} \underbrace{a_{k+1} a_{k+2} \ldots a_n}_{\text{Control bits}}.$$

The set C of all code words is a subset of $\mathrm{IF}_2^n$, wherein $\mathrm{IF}_2 = \{0,1\}$ is the set of binary numbers. If $C \subset \mathrm{IF}_2^n$ is a linear subspace of $\mathrm{IF}_2^n$ having the dimension of k, one speaks of a (binary systematic) linear (n, k) code. In the following, only such codes wherein n=160 and k=128 will be dealt with. For illustration purposes, a simplifying example of a linear (n, k) code with n=7 and k=4 will also be used. A linear (n, k) code may uniquely be described by means of its parity check matrix H. The parity check matrix H is a binary (n−k)×n matrix with a rank of n−k. It has the form of $H = (A, I_{n-k})$, wherein $I_{n-k}$ is the (n−k)×(n−k) unit matrix. The row vector $c \in \mathrm{IF}_2^n$ is a code word if, and only if, $$Hc^T = 0.$$

Here, $c^T$ has the meaning of the transpose of c. If c is a row vector, then $c^T$ is a column vector.

What will serve as an example from now on is a linear (7, 4) code which is defined by its parity check matrix $$H = \begin{pmatrix} 1011 & 100 \\ 1101 & 010 \\ 1110 & 001 \end{pmatrix}.$$

It will be seen that the first four columns of H form a matrix A, while the last three columns form the unit matrix $I_3$. It is easy to verify that c=(1,1,0,0,1,0,0) is a code word, since $Hc^T=(0,0,0)^T$, which means that the result of the preceding operation is the zero vector.

The operation of forming the redundancy word, i.e. the so-called encoding, shall be described in more detail below. If $H = (A, I_{n-k})$ is the parity check matrix of a binary linear (n, k) code, the k×n matrix $$G = (I_k, A^T)$$

is known as the canonical generator matrix of the code. Encoding the data word $a = a_1 a_2 \ldots a_k$ into the corresponding code word $c = a_1 a_2 \ldots a_k a_{k+1} \ldots a_n$ is performed by means of a matrix multiplication $$aG = c.$$

This is equal to $$\underbrace{a_1 a_2 \ldots a_k}_{\text{Information bits}} A^T = \underbrace{a_{k+1} \ldots a_n}_{\text{Control bits}}.$$

Referring back to the preceding example, for the parity check matrix H of the example, the corresponding canonical generator matrix G thus is the 4×7 matrix $$G = \begin{pmatrix} 1000 & 111 \\ 0100 & 011 \\ 0010 & 101 \\ 0001 & 110 \end{pmatrix}.$$

The data word $(a_1, a_2, a_3, a_4) \in \mathrm{IF}_2^4$ thus is encoded into the code word by the following operation:

$$c = (a_1, a_2, a_3, a_4) = (a_1, a_2, a_3, a_4, a_1+a_3+a_4, a_1+a_2+a_4, a_1+a_2+a_3).$$

This means that from the information bits $a_1 a_2 a_3 a_4$, the corresponding control bits are calculated in accordance with the following specification:

$$\underbrace{(a_1, a_2, a_3, a_4)}_{\text{Information bits}} \begin{pmatrix} 111 \\ 011 \\ 101 \\ 110 \end{pmatrix} = \underbrace{(a_1+a_3+a_4, a_1+a_2+a_4, a_1+a_2+a_3)}_{\text{Control bits}}.$$

Remark: It is to be noted that the parity check matrix H has a similar number of ones in each of its three rows. This property is desirable for an efficient hardware implementation of the encoding procedure. It is precisely then, specifically, that calculating each of the (n−k) control bits requires the same number of XOR operations, i.e. has the same logical depth. Another desirable property is for H to be thinly populated, a binary matrix H being referred to as thinly populated if it has relatively few ones.

The process of decoding, i.e. of verifying a data word to be verified with regard to any alteration, will be looked at in more detail below, as is performed by control means 14 in the inventive embodiment in FIG. 1.

x,y shall be two binary vectors for the following contemplations. The Hamming distance d(x, y) between x and y is the number of those coordinates where x and y differ. The Hamming weight w(x) of x is the number of coordinates of vector x which are not 0. Consequently, w(x)=d(x,0) and d(x, y)= w(x−y).

If C designates a code, the figure $$d = \min_{\substack{u,v \in C \\ u \neq v}} d(u, v)$$

will be referred to as the minimum distance of C.

The minimum distance of a linear code C is the minimum weight (Hamming weight) of each code word which is not 0. Thus, $$d = \min_{0 \neq c \in C} w(c).$$

If H is the parity check matrix of a linear code, then and only then—the code has a minimum distance d if all d−1 columns of H are linearly independent and all d columns are linearly dependent.

In the case of binary codes, this is equivalent to the definition of the minimum distance d, as was given above. These properties, in turn, will be applied below to the example introduced above, the parity check matrix H being contemplated. Any combination of three columns of H is linearly independent, four columns being linearly dependent, respectively. Thus, the linear code corresponding to matrix H has the minimum distance of d=4.

A linear code having an even-numbered minimum distance d may correct (d−2)/2 errors and detect d/2 errors at the same time.

Let us assume that the message $a \in IF_2^k$ has been coded into code word $C \in IF_2^n$, and thereafter has been transmitted via a noisy channel (or stored in a mass memory). What is received is the vector $y \in IF_2^k$. If fewer than (d−1)/2 errors occur during the transmission (or during the storage), the correct code word c may be reconstructed from y on the receiver side. In order to achieve this, the so-called syndrome is required.

The syndrome is defined as follows: H be the parity check matrix of a linear (n, k) code C. Then the column vector $S(y) = Hy^T$ of the length n−k is referred to as the syndrome of $y \in IF_2^n$.

Due to the definition of the parity check matrix H, $y \in IF_2^n$ is a code word when, and only when, S(y) is the zero vector.

This also results in that for a binary code, the syndrome equals the sum of those columns of the parity check matrix H in which errors have occurred. This also explains the name of syndrome of S(y), since the syndrome indicates the symptoms of the errors.

The above understanding is to be applied to the linear (7, 4) code of our example which is defined by the parity check matrix $$H = \begin{pmatrix} 1011 & 100 \\ 1101 & 010 \\ 1110 & 001 \end{pmatrix}.$$

For this purpose, let us initially assume that the vector y=(1,0,1,0,0,0,1) is received. Calculating the syndrome yields the following result:

$$S(y) = Hy^T = \begin{pmatrix} 0 \\ 1 \\ 1 \end{pmatrix}.$$

The syndrome S(y) matches the second column vector of matrix H, which indicates that the second coordinate of y is flawed. Also, the correct code word is c=(1,1,1,0,0,0,1), and the bits which carry information are 1110.

In the code, which will be described further below in the inventive embodiment, the sub-matrices which form the parity check matrix of a linear code, are formed by circulant matrices, which is why those properties of the circulant matrices which are relevant for the invention will be briefly discussed below.

A circulant matrix of the order n is a squared n×n matrix which is entirely determined by its first row. In each row subsequent to the first row, the individual matrix elements are shifted to the right by precisely one position, the matrix elements being which are moved out of the matrix on the right-hand side being re-inserted into the row on the left-hand side. Thus, for example, $$Z = \begin{pmatrix} abcde \\ eabcd \\ deabc \\ cdeab \\ bcdea \end{pmatrix}$$

is a circulant matrix of the order of 5. For this matrix, too, the notation Z=[a, b, c, d, e] will be used below.

If A and B are two circulant matrices of the order of n, the product C=AB in turn is a circulant matrix of the order of n.

The set of all non-singular (i.e. invertible) binary n×n matrices form a group under matrix multiplication, the general linear group $GL(n, IF_2)$. The set of all binary, non-singular circulant matrices is a subset of $GL(n, IF_2)$. If A is a non-singular binary circulant n×n matrix, there will be at least one positive integer e, so that $A^e = I_n$, $I_n$ designating the n×n unit matrix. This results in that $A^{e-1}$ must be the inverse of matrix A, which is also referred to by $A^{-1}$.

One property of the circulant matrices is that the inverse of a non-singular circulant matrix again is a circulant matrix. The calculation of the product of a circulant matrix A and of a column vector u may be implemented in hardware, by means of a logic circuit, in a manner which saves space and current. Au=x shall apply, i.e.

$$\begin{pmatrix} a_1 & a_2 & \cdots & a_n \\ a_n & a_1 & \cdots & a_{n-1} \\ \vdots & \vdots & \ddots & \vdots \\ a_2 & a_3 & \cdots & a_1 \end{pmatrix} \begin{pmatrix} u_1 \\ u_2 \\ \vdots \\ u_n \end{pmatrix} = \begin{pmatrix} x_1 \\ x_2 \\ \vdots \\ x_n \end{pmatrix}.$$

This is equal to $x_1 = a_1 u_1 + a_2 u_2 + \ldots + a_n u_n,$ $x_2 = a_n u_1 + a_1 u_2 + \ldots + a_{n-1} u_n,$ $\ldots$ $x_n = a_2 u_1 + a_3 u_2 + \ldots + a_1 u_n.$ To implement the above equations in hardware, one requires a register with n flip-flops which contains the entries of the coordinates of u. Each flip-flop has an output connected to a constant multiplier. This constant multiplier has an input and provides, as a result of an operation, the product of the input with a binary constant $a_i$. The outputs of all n constant multipliers are subjected to XOR operations with each other so as to create a single common result.

At the beginning of a matrix operation as has been represented above, the register is filled with data bits $u_1, u_2, \ldots, u_n$. Therefore, the produced result described by the above hardware will be $x_1$. In the next step, the contents of the flip-flops will be rotated to the left by one position, so that the register now contains the binary numbers $u_2, u_3, \ldots, u_n, u_1.$ In this step, the result of the above hardware arrangement will thus be $x_2$. This process is repeated for such time until all coordinates $x_1, x_2, \ldots, x_n$ have been calculated.

In the following paragraphs, a specifically constructed code applied within redundancy unit 12 and control unit 14 will be described as a specific embodiment of the present invention. Specific areas on which any design may focus were the possibility of efficiently integrating the code into hardware and of causing as low a current consumption as possible in the implementation of the code in the redundancy unit and the control unit 14. The implementation of this specific requirement will be dealt with in detail as and when relevant.

The inventive code (ECC 160) is a special systematic linear (160, 128, 4) code. Thus, this means that 128 bits carrying information have 32 control bits associated with them so as to form a code word of the length of 160 together. The Hamming distance between individual code words is at least 4. The parity check matrix $$H=(A, I_{132})$$

is a n×(n*k) or 32×160 matrix (with n=32, k=5), $I_{32}$ describing the 32×32 unit matrix. H also has 32 rows and 160 columns. The 32×128 matrix A is of the form $$A=(A_0,A_1,A_2,A_3),$$

wherein for each j=0, 1, 2, 3, the sub-matrix $A_j$ is a non-singular, thinly populated circulant 32×32 binary matrix which has the property that $A_j^2=I_{32}$. This property means that $A_j$ is identical with its inverse $A_j^{-1}$ (idempotency). The matrices $A_j$ here are $$A_0 = [\,10000100 \quad 00000000 \quad 00000100 \quad 00000000\,],$$
$$A_1 = [\,10000010 \quad 00000000 \quad 00000010 \quad 00000000\,],$$
$$A_2 = [\,10000001 \quad 00000000 \quad 00000001 \quad 00000000\,],$$
$$A_3 = [\,10000000 \quad 10000000 \quad 00000000 \quad 10000000\,],$$

wherein use has been made of the convention stating that circulant matrices may unambiguously be represented by means of indicating their first rows, respectively, as has been set forth in the above paragraph. The matrices $A_j$ here are selected from the selection of idempotent circulant matrices $P_i$, $0 \leq i \leq 14$, indicated in FIGS. 4a to 4d.

FIGS. 4a to 4d show the 15 possible circulant, non-singular, thinly populated 32×32 binary matrices which have the property of being idempotent. As may be seen with regard to a first row 100 of matrix $P_0$ and a second row 102 of the matrix, a row 102 of the matrix which follows the first row is created in that the entries of the second matrix row 102 are shifted to the right by one position, in each case, in comparison with the entries of the first matrix row 100. The following matrices are selected from the possible matrix for the inventive code:

$$A_0=P_4, A_1=P_5, A_2=P_6, \text{ and } a_3=P_7,$$

For the following mathematical considerations, the following conventions regarding the notation will be used. If $v=(v_0, v_1, \ldots, v_{n-1})$ is a row vector, then the transpose $v^T$ is the column vector corresponding to v:

$$v^T = \begin{pmatrix} v_0 \\ v_1 \\ \vdots \\ v_{n-1} \end{pmatrix}.$$

For both cases, we write $v \in IF_2^n$ and $v^T \in IF_2^n$. Also, if A is an m×n matrix, the transpose of A, i.e. $A^T$, is an n×m matrix, the $j^{th}$ column of which being the transpose of the $j^{th}$ row of A, wherein $1 \leq j \leq m$.

This is to be illustrated using the following example:

$$\text{If } A = \begin{pmatrix} 110 \\ 011 \end{pmatrix}, \text{ then } A^T = \begin{pmatrix} 10 \\ 11 \\ 01 \end{pmatrix}.$$

The basic processing steps to be performed by redundancy unit 12 and control unit 14 using the ECC 160 code will now be represented in the following paragraphs.

Initially, the encoding of a message by means of control unit 12 is depicted, which is schematically represented in the state diagram in FIG. 2 by the redundancy formation 46 and the subsequent creation of the overall bit vector 48. A message $m \in IF_2^{128}$, which consists of four 32-bits words, serves as an example:

$$m=(m_0,m_1,m_2,m_3)$$

Encoding here means that a further 32-bits word r is calculated, which is referred to as the redundancy word and/or the control bit vector 40, and that the redundancy word is subsequently linked to message m (and/or data bit vector 38) so as to form the overall bit vector 42. The 160-bits row vector $$c=(m,r)=(m_0,m_1,m_2,m_3,r),$$

resulting therefrom is referred to as a code word. The redundancy word r of message m is calculated in accordance with the following formula:

$$\boxed{r = mA^T} \qquad \text{Equation 1}$$

Said equation may, alternatively, also be represented as follows:

$$r=m_0A_0^T+m_1A_1^T+m_2A_2^T+m_3A_3^T.$$

An illustration shall be given below as to how the redundancy unit 12 verifies whether or not a received message of a length of 160 bits is a code word. In an ideal world, where there are no random bit errors and no attackers who deliberately cause errors, all data words occurring within a microprocessor are code words. If either a 1-bit error occurs at any position of a data word, encoded by the redundancy unit 12 or encrypted in the encryption/decryption unit 20, in the mass memory 22, or if a 1-bit error occurs in any bit of the 160 bits of a message y, e.g. in cache 16, this error will be detected and corrected by code ECC 160. Larger errors (which are caused, for example, by a microprobe, by light or overvoltage attacks, etc.) are detected with a probability of $1:2^{32}$.

In the following, let us assume, as 160-bits information y, a row vector, i.e. $y \in F_2^{160}$.

In order to verify whether y is a code word, the control unit 14 calculates the syndrome S(y) of y, or the syndrome bit vector 58 which is a 32-bits column vector. The vector y is a code word precisely when S(y) is the zero vector. Here, the syndrome S(y) is formed in accordance with the following calculating specification:

$$\boxed{S(y) = Hy^T},$$

H is the parity check matrix as was introduced in the preceding paragraphs. Thus, the following applies:

$$\boxed{y \text{ is a code word} \Leftrightarrow S(y) = 0}.$$

To better understand the probability with which an attack on the system may be proven by the code, the effect that an error vector introduced into the system has on the system will be briefly set forth below. To this end, let us initially assume a code word $c \in IF_2^{160}$. If c is altered to $y \in IF_2^{160}$ as a result of an external attack, the alteration, i.e. the attack, may be described in that an error vector $e \in IF_2^{160}$ is added to the code word c (=bitwise XORing). Depending on the type of attack, the error vector e may be a random vector. Thus, y=c+e, and when forming the syndrome, one obtains:

$$S(y)=Hy^T=Hc^T+He^T=He^T$$

Consequently, a fault attack will remain unnoticed when, and only when, the error vector e is also a code word. If e is a random 160-bits vector, then the probability of e being a code word is $1:2^{32}$.

A further property which the special code in accordance with the embodiment of the present invention exhibits is the possibility of being able to correct a 1-bit error efficiently and fast. If a 1-bit error occurs within the 160 bits of message y anywhere between the encryption/decryption unit 20 and control unit 14, this error may be corrected within one or two calculation steps by the inventive code ECC 160.

This will be briefly explained below, wherein initially $y \in F_2^{160}$. For verifying y, the syndrome $S(y)=Hy^T \in IF_2^{32}$ is initially formed. If the syndrome does not equal the zero vector, and if S(y) equals one of the 160 column vectors of the parity check matrix $$H=(A,I_{32})=(h_0,h_1,\ldots,h_{159}),$$

assuming, for example, that $S(y)=h_j$ is true, it may be inferred that the coordinate $y_j$ of $y=(y_0, y_1, \ldots, y_{159})$ is flawed. In order to correct the error, the only thing that needs to be done is to replace $y_j$ by $y_j+1$. Due to the specific form of the parity check matrix H, one obtains the property that, in the case of an error, syndrome S(y) corresponds to one of the 160 columns of matrix H. Locating this specific column within one or two calculation steps is possible if a specific logic is additionally integrated into hardware.

Reference shall be made below to the correction of 1-bit errors as occur in mass memory 22, these 1-bit errors being corrected by control unit 14.

A code word $$c=(m_0,m_1,m_2,m_3,r) \in F_2^{160}$$

shall be assumed as the basis for the following considerations. An encrypted version of the code word is stored in a non-volatile memory 22 (NVM, RAM or ROM), the code word having been encrypted by encryption/decryption unit 20 (MED). For the contemplations that follow, the encryption is to image the space of $IF_2^{32}$ onto itself, which means that:

$$MED: a \in IF_2^{32} \mapsto MED(a) \in IF_2^{32}.$$

Here, $MED^{-1}$ is to designate, from now on, the inverse operation of encryption/decryption unit 20 which is used for encrypting. The operation wherein MED is applied to an argument $a \in IF_2^{32}$ is referred to as encryption. The operation which is inverse thereto, i.e. the application of $MED^{-1}$ to an argument $b \in F_2^{32}$, is referred to as decryption.

Here, a significant security-relevant feature of the MED is the so-called avalanche effect: if two arguments a and a' differ with regard to only one of their bit positions, MED (a) and MED (a') will differ with regard to about half of their bits. In equivalence therewith, $MED^{-1}(b)$ and $MED^{-1}(b')$ will generally differ with regard to a number of bits, which on average is 16, if b and b' from $IF_2^{32}$ differ with regard to one bit.

The code word $c=(m_0, m_1, m_2, m_3, m_4) \in IF_2^{160}$ with $m_4=r$ is encrypted by separately applying the MED function to each individual word $m_j \in IF_2^{32}$. Thereby, an overall bit vector 42 is turned into an encrypted overall bit vector 44 during transfer step 50. Accordingly, the following data vector will be stored in a non-volatile memory:

$$(MED(m_0), MED(m_1), MED(m_2), MED(m_3), MED(m_4))$$

Every now and then a random 1-bit error, a so-called "moving bit error", will occur. Since this is a very rare case, one can assume that in most such cases only an individual bit of the 160 bits of the information stored will be altered. In the following, it shall be assumed that one word from the above equation exhibits a 1-bit error, while the other four words are correct. If the above-described 160-bits row vector is read, it is decrypted by the MED, and the control unit 14 obtains the following 160-bits vector as a decrypted overall bit vector 56:

$$y=(y_0,y_1,y_2,y_3,y_4)$$

What can be said about four of the indices $j \in \{0,1,2,3,4\}$ is that the original data words correspond to the data words which have been read and decrypted, i.e. that $y_j=m_j$, however there is a single index j for which $y_j \neq m_j$ applies. Due to the above-described avalanche effect, $y_j$ and $m_j$ differ with regard to more than one bit position.

For the purposes of a verification by the control unit 14, it shall be initially assumed that y is an overall bit vector 56, after a reading operation, which has been decrypted and comes from the encryption/decryption unit 20. The syndrome S(y) is initially calculated. If S(y)=0, it shall be assumed that no error, in particular no moving bit error, has occurred. If $S(y) \neq 0$, there are, in principle, two possibilities:
   i) a moving bit error has occurred;
   ii) several errors have occurred, probably as a result of an attack on the system.

In order to decide which case is at hand, and in order to correct, in case 1), the moving bit error, the inventive apparatus proceeds as will be described below. Initially, one operates on the hypothesis that a moving bit error has occurred in the stored word MED(r). Then, $y_4 \neq r$, but also $y_j=m_j$ for all j=0,1,2,3.

Therefore, the inventive apparatus works through, bit by bit, the following algorithm:
  1. Calculate $x_4=(y_0, y_1, y_2, y_3)A^T$.
  2. Calculate $MED(x_4)$ and $MED(y_4)$.
  3. Calculate $d=dist(MED(x_4), MED(y_4))$.
     (A reminder shall be given that for u, $v \in IF_2^k$, dist (u, v) designates the Hamming distance between u and v.)

If d=1, the hypothesis stated above is confirmed. In this case, $y_4$ is replaced by $x_4$ so as to obtain the code word $$c^{[4]}=(y_0,y_1,y_2,y_3,y_4) \in IF_2^{160}$$

then corrected, whereby the moving bit error has also been corrected.

If $d \neq 1$, the above hypothesis must be discarded. As the next hypothesis it shall then be assumed that a moving bit error has occurred in $MED(m_0)$, so that $y_0 \neq m_0$ and $y_j=m_j$ for all j=1,2,3,4.

The algorithm to be worked through then reads as follows:
  1. In $(y_0, y_1, y_2, y_3,)$, replace the word $y_0$ by the zero word $0 \in IF_2^{32}$, and calculate $q=(0, y_1, y_2, y_3)A^T$.
  2. Calculate b=q+r, wherein $r=y_4$.
     (Here, the "+" sign describes the bitwise addition modulo 2, i.e. bitwise XORing.)
  3. Calculate $x_0^T=A_0 b^T$, wherein $A_0$ is the 32×32 sub-matrix from the parity check matrix H.
  4. Calculate $MED(x_0)$ and $MED(y_0)$.
  5. Calculate $d=dist(MED(x_0), MED(y_0))$.

If d=1, the hypothesis is confirmed. In this case, the data word $y_0$ is replaced by $x_0$, and one obtains $$c^{[0]}=(x_0,y_1,y_2,y_3,y_4) \in IF_2^{160}$$

as the reconstructed 160-bits row vector.

Thus, $c^{[0]}$ is a code word, and the moving bit error has been corrected. If $d \neq 1$, the hypothesis must be discarded.

If necessary, the above-described algorithm is performed for all j=1,2,3, it being required to make the obvious adjustments. For example, in the case of j=1, the hypothesis that a moving bit error has occurred in MED($m_1$) is made. In the first step of the above algorithm, $y_1$ is replaced by the zero word 0 within the word ($y_0$, $y_1$,$y_2$,$y_3$) In the third step, one uses the sub-matrix $A_1$ (instead of $A_0$), and the vector calculated therefrom is $x_1$.

If it is not possible, again, to confirm the hypothesis, the hypotheses for j=2 and j=3, which are analogous thereto, are verified. If all (5) hypotheses are flawed, one will infer therefrom that a multi-bit error, i.e. a simultaneous alteration of several data bits stored, has occurred, which is very likely to be the result of an attack.

The inventive code additionally has the important property of being able to reliably recognize the alteration of several bits adjacent to one another.

In order to verify this, one shall initially consider the 32×160 parity check matrix H=(A, $I_{32}$)=($h_0$, $h_1$, ..., $h_{159}$) which fully describes code ECC 160 in accordance with the theoretic assumptions made in the previous paragraphs. It can be shown that any combination of k≦32 successive column vectors $h_j$ of matrix H are linearly independent. In other words, this means that for each 0≦i≦159 and for each 1≦k≦32, the set of column vectors $\{h_i, h_{i+1}, \ldots, h_{i+k-1}\}$ (with indices modulo 160) will never contain a subset of column vectors which are added to the zero vector.

This remarkable property of the parity check matrix H implies that the ECC 160 can recognize, with absolute certainty, each burst error of a length≦32. This means, in other words, that if a maximum of k≦32 bits become flawed in a code word c=($c_0$, $c_1$, ..., $c_{159}$), and if the first and last flawed bits are spaced apart no further than 32 positions, the presence of an e∈$IF_2^{160}$ is recognized with absolute certainty. In this case, the syndrome S(y) of y=c+e will not be 0.

The ability to detect burst errors is an essential feature of the code. To illustrate this, we shall contemplate a code word c=($m_0$, $m_1$, $m_2$, $m_3$, r)∈$IF_2^{160}$ which is transmitted via a data bus consisting of 32 data paths. Here, the data words $m_0$, ..., $m_3 \in IF_2^{32}$ and the redundancy word r∈$IF_2^{32}$ are transmitted successively. If an individual word is altered in a random manner by a light, laser or overvoltage attack, while the other four words remain unchanged, the attack will be recognized using the following syndrome test.

In a different scenario, we shall contemplate cache 16 or the buffer memory, wherein the code words are essentially stored in a linear manner, i.e. wherein successive logical bits correspond to successive physical bits. By a light or laser attack, the bits in so-called clusters, i.e. groups of memory bits arranged side by side, are changed. As long as the size of the cluster is limited to a length of a maximum of 32 bits, this attack will also be recognized with absolute certainty.

In addition, the inventive code has the so-called Delta property, which is an essential advantage for a current-saving implementation of the code in hardware, and which will be briefly discussed below. For this purpose, a code word c=(m, r)∈$IF_2^{160}$ shall be contemplated. If the message m∈$IF_2^{128}$ is split up into individual bytes $b_j \in IF_2^8$, the code word may also be written as follows:

$$c=(m,r)=(b_0,b_1,\ldots,b_{15},r).$$

A frequently occurring case is that a byte $b_j$ of the message m is to be replaced by a different byte $b'_j$. Encoding the entire new message block $$m'=(b_0,\ldots,b_{j-1},b'_j,b_{j+1},\ldots,b_{15})$$

provides the new code word $$c'=(m',r')=(b_0,\ldots,b_{j-1},b'_j,b_{j+1},\ldots,b_{15},r')$$

The task to be achieved is to find out how the redundancy word r' may be calculated in a less current-consuming manner.

Initially, r=$mA^T$ and r'=$m'A^T$.
Thus, $$r'=m'A^T=(m'-m)A^T+mA^T=\Delta A^T+r,$$

wherein $$\Delta=m'-m=(0,\ldots,0,\Delta_j,0,\ldots,0)\in IF_2^{128}$$

and wherein $$\Delta_j=b'_j-b_j=b'_j+b_j.$$

is the difference (or the sum, i.e. bitwise XORing of the old and the new bytes.

What shall be set forth below is how the Delta property of the ECC 160 code is implemented into the inventive hardware in the form of an algorithm.

What is used as a basis here is a code word c=(m,r), wherein the $j^{th}$ byte $b_j$ of message block m is replaced by byte $b'_j$, whereupon the redundancy word is to be updated. This requires the following steps:

1. Calculate $\Delta_j=b_j+b'_j$.
2. Calculate s=$(0,\ldots,0,\Delta_j,0,\ldots,0)A^T$.
3. Calculate r'=s+r.

The data word r' will then be the very updated redundancy word.

In mathematical terms, this may also be phrased differently. To this end, the 32×32 matrices $A_0, A_1, A_2, A_3$ occurring in the parity check matrix H are subdivided into 32×8 sub-matrices $B_j$ such that $$A_0=(B_0,B_1,B_2,B_3), A_1=(B_4,B_5,B_6,B_7),$$

$$A_2=(B_8,B_9,B_{10},B_{11}), A_3=(B_{12},B_{13},B_{14},B_{15}).$$

This may also be written as follows:

$$A^T = \begin{pmatrix} A_0^T \\ A_1^T \\ A_2^T \\ A_3^T \end{pmatrix} = \begin{pmatrix} B_0^T \\ B_1^T \\ \vdots \\ B_{15}^T \end{pmatrix},$$

wherein the $B_j^T$ are 8×32 matrices. The vector s∈$IF_2^{32}$, which is required in the implementation of the Delta property, may then be calculated as follows:

$$\boxed{s = \Delta_j B_j^T}.$$

The design criteria hthat were important for developing the ECC 160 code are that implementing the code in hardware takes up a small area on the chip, and that the code causes only low current consumption during operation. There is indeed no linear (160, 128) code with a minimum Hamming distance of d=4 whose implementation takes up less chip area (i.e. whose parity check matrix contains fewer ones), or whose operation (encoding and syndrome calculation) causes less current consumption. However, there is a linear (160, 128) code with a minimum Hamming distance d=2 which may be implemented on a smaller chip area and which consumes less current than the ECC 160 code. Said code shall be defined by the following parity check matrix:

$H=(I_{32}, I_{32}, I_{32}, I_{32}, I_{32})$ wherein $I_{32}$ designates the 32×32 unit matrix. For this specific code, the redundancy word $r \in IF_2^{32}$ is obtained by XORing the four data words $m_0, \ldots, m_3$, i.e. it is $$r = m_0 + m_1 + m_2 + m_3.$$

However, said code offers only very little protection from attacks wherein individual bus lines are intercepted and/or altered ("forcing"). If, for example, an attacker alters a data line while a code word is being transmitted, the attack cannot be detected if two or four bits are altered. If 1, 3 or 5 bits are altered, a subsequent syndrome test will be able to prove the attack using this code. Thus, such an attack is detected with a probability of only 3/5=60%. By contrast, the ECC 160 code can prove an above-described attack with absolute certainty using a syndrome test. (Due to the specific structure of the parity matrix $H=(h_0, h_1, \ldots, h_{159})$ which defines the ECC 160 code, all subsets of the form $\{h_j, h_{j+32}, h_{j+64}, h_{j+96}, h_{j+128}\}$ with $0 \le j \le 31$ are linearly independent.)

The criteria to bear in mind when constructing the inventive code will be discussed in more detail below with regard to their hardware implementation.

The essential characteristics of an error correction code are the code dimension k, the code length m, the code distance $d_{min}$, the error correction capability t, the code efficiency r, and the probability $P_u$ of not detecting an error. The number of check bits m is calculated as m=n−k.

The code efficiency is defined as the ratio of the number of check bits to the number of message bits, i.e. it is a measure of the overhead resulting due to the protection. The first requirement placed upon a code is that it may be described in a systematic form. This means that each individual code word c must be separable into a form c=(m, p), m being the message bit vector and p being the correction bit vector.

Furthermore, we shall assume for the code to consist of elements of $F_2$. Generally, binary codes are preferred for efficient hardware implementations, since codes which are based on other underlying data quantities normally give rise to the implementation of expensive Galois field arithmetic. It is for the same reason that linear codes are preferred.

The overall number of ones in each individual row of the parity check matrix H is directly related to the logic depth of the circuit which is used, in one hardware implementation, to form the control bit or the syndrome bit of the row in question. If $e_i$ is the overall number of ones in the $i^{th}$ row, the logic depth of the circuit which calculates a check bit is given by the following formula:

$$l_c(i) = \lceil \log_p(e_i-1) \rceil.$$

The logic depth of the syndrome bit circuit is then given by $$l_s(i) = \lceil \log_p(e_i) \rceil,$$

p describing the number of inputs of the XOR cells used in the hardware implementation (e.g. 2 or 3).

For a hardware implementation of the parity check matrix H, this means that minimum hardware costs, a minimum current consumption and a minimum work-through time may be achieved by minimizing the number of ones in each row of the parity check matrix.

A second requirement is that the number of ones in each row be as close as possible to the average number of ones per row. This equal distribution of ones ensures that a long, critical work-through path does not occur in the encoding circuit, or the circuit calculating the syndrome bit.

As a general rule: if C is a linear code with an associated parity check matrix H, the Hamming distance of C equals the smallest number of columns of H, which are added to the zero vector.

In the event that each column of H contains an odd number of ones, the above statement results in that the Hamming distance of the code must be at least 4. Codes which follow the above three principles (minimum number of ones, equal number of ones in each row of matrix H, odd number of ones in each column of matrix H) are referred to as Hsiao codes. This class of codes thus guarantees optimum efficiency in the integration into a computer hardware.

A further consequence of the above general statement is that a larger Hamming distance of a code generally leads to a larger number of ones in a parity check matrix (even though there is no strict mathematical connection).

The inventive code complies with the above principles and additionally has the Delta property, and is furthermore MED-compatible—properties which are indispensible for a current-efficient and space-efficient implementation in safety controllers.

The code efficiency r of the ECC 160 is r=25%. If the overhead resulting therefrom is too high for any application planned, a code having a code efficiency of r=12.5% may be additionally be implemented from the inventive code family, eight of the circulant matrices depicted in FIGS. 4*a*-4*e* having to be used for constructing matrix H. The circuits for error detection, for syndrome calculation, for implementing the Delta property and for error correction must then be adjusted in an obvious manner.

The fact that the inventive error code ECC 160 can be implemented in a particularly hardware-efficient manner will be set forth again briefly below.

The implementation of the matrix multiplication in equation 1 requires 32×16=512 XOR gates with two inputs, and has a logic depth of 4. If one uses a mixture of XOR gates having two and three inputs, 32×9=288 gates will be required, and the logic depth will decrease to 3.

Here, the syndrome may be calculated by the same hardware in each case, reference being made to the paragraphs which follow for the exact derivation of the connection.

The Delta property and the algorithm for implementing same may also be executed by the same hardware. In this case, only a group of eight adjacent rows of the matrix is multiplied by the altered byte. For reasons concerning the current balance, care must be taken that that part of the circuit which is associated with the unchanged bytes does not get into an undefined state. If it is possible to ensure this, the current consumption of an update of a byte will be, when utilizing the Delta property, only about 10% of the current consumption incurred when encoding an entire message block.

In the previous equations, both matrices and the matrices transposed to the matrices have been used. This is so because in the previous descriptions of the inventive linear code, the standard conventions particularly with regard to the representation of the relevant matrices have been adhered to as far as possible. In a typical application, matrix M will be used in one place, and matrix $M^T$ transposed thereto will be used in another place. In order to ensure efficient implementation (for example in the hardware description language VHDL) of the code, one can refrain from using both M and $M^T$ in only one preferred embodiment of the present invention. The utilization of the transpose of all matrices may indeed be completely avoided by observing the following rules (even if this leads to the additional effort of having to calculate both with row and with column vectors):

$$(A^T)^T = A \text{ and } (AB)^T = B^T A^T$$

Using the above equations, the formulae describing the encoding and the syndrome test may be transformed as follows:

$$r^T = Am^T$$

$$r^T = A_0 m_0^T + A_1 m_1^T + A_2 m_2^T + A_3 m_3^T$$

$$x_4^T = A \begin{pmatrix} y_0^T \\ y_1^T \\ y_2^T \\ y_3^T \end{pmatrix} = A_0 y_0^T + A_1 y_1^T + A_2 y_2^T + A_3 y_3^T$$

$$q^T = A \begin{pmatrix} 0 \\ y_1^T \\ y_2^T \\ y_3^T \end{pmatrix} = A_1 y_1^T + A_2 y_2^T + A_3 y_3^T$$

$$s^T = A \begin{pmatrix} 0 \\ \vdots \\ 0 \\ \Delta_j^T \\ 0 \\ \vdots \\ 0 \end{pmatrix}.$$

In a further specific embodiment of the present invention, the ECC 160 code, which has just been described, is modified. In this modification, the error correction may be achieved faster using the code, which is made possible at the cost of slightly increased hardware efforts. What will be shown below is that for this variant of the code, it is more favorable to construct the parity check matrix H from four thinly populated, circulant matrices which are not self-inverse but instead use two matrices which are inverse to one another in a pair-wise manner, respectively.

In the following contemplations, m is a message of the dimension of k=128 bits, organized in words of lengths of 32 bits. The length of a code word is n=160 bits, and the length of the check bit vector thus is n−k=32 bits.

$$m=(m_0, m_1, m_2, m_3) \text{ mit } m_i \in (0,1)^{32}.$$

The canonical generator matrix of this systematic linear code is given by $$G = (I_k, P) = \begin{pmatrix} I_k & \begin{matrix} |P_0 \\ |P_1 \\ |P_2 \\ |P_3 \end{matrix} \end{pmatrix},$$

wherein p is a 128×32 matrix, and $P_i$ is 32×32 matrices. That is, G is a (n*(k−1))×(n*k) matrix with here n=32 and k=5). The check bit vector p is calculated from $$p = m \cdot P,$$

and the code word is $$u = m \cdot G = (m, p)$$

The parity check matrix H thus is $$H = (-P^T, I_{n-k}) = (P_0^T, P_1^T, P_2^T, P_3^T, I_{32}).$$

The generator matrix G is the zero space of the parity check matrix, i.e.

$$G \cdot H^T = 0.$$

We shall refer to the possibly altered code word by v=u+e, wherein e is the error vector. The syndrome vector s is calculated in accordance with the following formula:

$$s = v \cdot H^T = (u+e) \cdot H^T = e \cdot H^T.$$

If there is no error bit vector, the syndrome bit vector will be the zero vector 0. In the following notation, ρ will be used to designate any vector, and not always be the same vector, from the quantity of vectors $(0,1)^{32}$.

In order to illustrate the inventive code, the redundancy information, to be calculated by redundancy unit 12, and the storing and encrypting by the encryption/decryption means 20 will initially be described below in a step-by-step manner.

1. Calculating the check bit vector $$p = m \cdot P = m_0 P_0 + m_1 P_1 + m_2 P_2 + m_3 P_3$$

2. Forming the code word $$u = (m \cdot p) \equiv (u_0, u_1, u_2, u_3, u) = (m_0, m_1, m_2, m_3, p)$$

3. Encrypting the code word using the MED and/or encryption/decryption means 20. In the following, $e^k(x)$ is to designate an encryption operation of the MED, a 32-bits word x being encrypted with a key k. The word-by-word encryption may thus be written as follows:

$$u_i^e = e^k(u_i) \text{ for } i=1,2,3,4,5\ldots$$

4. Forming the encrypted code vector:

$$u^e = (u_0^e, u_1^e, u_2^e, u_3^e, u_4^e).$$

5. Storing the encrypted code vector $u^e$ in, for example, mass memory 22.

The process of reading from the memory, and of reconstructing a flawed bit by control unit 14 will also be described in a step-by-step manner below.

Here, the case of a correctable 1-bit error, e.g. of a moving bit error, in a non-volatile memory such as mass memory 22 will initially be dealt with. Without limiting generality, it shall be assumed that the 1-bit error is located at position f in the second 32-bits word. The encrypted code vector, or the encrypted overall bit vector 54, which is read out from the memory shall be designated by v. It is $v=u^e+e$ with $e=(e_0, e_1, e_2, e_3, e_4) = (0, e_1, 0, 0, 0)$ and $e_1 = (0, \ldots, 0, 1, 0, \ldots, 0)$ 1. Reading the encrypted message v from the memory.

$$v = (v_0, v_1, v_2, v_3, v_4) = (u_0^e, u_1^e + e_1, u_2^e, u_3^e, u_4^e)$$

2. Decrypting the message in the decryption step 66 by the MED. By analogy with the above-described case, $d^k(x)$ designates an MED decryption of a 32-bits word x by means of key k. Thus, the following calculation is executed in the decryption operation:

$$v_i^d = d^k(v_i) \text{ for } i=1,2,3,4,5.$$

For the above-described error case, the result of the above operation will be, in particular:

$$v_0^d = d^k(v_0) = d^k(u_0^e) = d^k(e^k(u_0)) = m_0$$

$$v_1^d = d^k(v_1) = d^k(u_1^e + e_1) = \rho$$

$$v_2^d = m_2$$

$$v_3^d = m_3$$

$$v_4^d = p$$

Due to the perfect decorrelation of adjacent bits on the part of the MED algorithm, $v_i^d$ will be a random bit vector of a length of 32 bits.

3. Calculating the syndrome bit vector 58:

$$s = v^d \cdot H^T$$
$$= v_0^d P_0^T + v_1^d P_1^T + v_2^d P_2^T + v_3^d P_3^T + p$$
$$= m_0 P_0^T + \rho P_1^T + m_2 P_2^T + m_3 P_3^T + p$$
$$= \rho$$

It is with a probability of $p \approx 2^{-32}$ that the syndrome bit vector will equal the zero vector. Thus, the probability of not detecting a bit error is $p \approx 2^{32}$.

4. Finding the flawed word.

A non-trivial step is to locate the flawed word and to correct the error, since the error-correcting code is applied, as is known, prior to encryption. When contemplating the parity check equation $s=v \cdot H=0$, said equation may be solved for each of the 32-bits words of the message:

$$v'_0 = (v_1 P_1 + v_2 P_2 + v_3 P_3 + v_4) \cdot P_0^{-1}$$
$$v'_1 = (v_0 P_0 + v_2 P_2 + v_3 P_3 + v_4) \cdot P_1^{-1}$$
$$v'_2 = (v_0 P_0 + v_1 P_1 + v_3 P_3 + v_4) \cdot P_2^{-1}$$
$$v'_3 = (v_0 P_0 + v_1 P_1 + v_2 P_2 + v_4) \cdot P_3^{-1}$$
$$v'_4 = (v_0 P_0 + v_1 P_1 + v_2 P_2 + v_3 P_3) \quad \text{Equation 2}$$

In the substitution step 70, the above decrypted substituted data word vectors 62a-62e are formed. On the basis of knowing four of the five data words, one can thus reconstruct the remaining fifth data word. The reconstructed words are marked by apostrophes.

For our example contemplated, one will obtain the following as the first 32-bits word:

$$m'_0 = (v_1^d P_1 + v_2^d P_2 + v_3^d P_3 + v_4^d) \cdot P_0^{-1}$$
$$= (\rho P_1 + m_2 P_2 + m_3 P_3 + p) \cdot P_0^{-1}$$
$$= \rho$$

Now the reconstructed and/or substituted word is in turn encrypted, $m'_0{}^e = e^k(m'_0)$, and the Hamming distance of $m'_0{}^e$ from the word $v_0$ which was originally read from the memory was formed:

$$d_0 = d(m'_0{}^e, v_0).$$

In an exemplary case, it is with a probability of $p \approx 2^{32}/32 = 2^{28}$ that one obtains $d_0 = d(\rho, v_0)$, wherein $d_0 > 1$.

Since $d_0$ does not equal 1, what is inferred is that $v_0$ is not the word that contains the bit error.

In a next step, the same procedure is applied to the second data word:

$$m'_1 = (v_0^d P_0 + v_2^d P_2 + v_3^d P_3 + v_4^d) \cdot P_1^{-1}$$
$$= (m_0 P_0 + m_2 P_2 + m_3 P_3 + p) \cdot P_1^{-1}$$
$$= m_1$$

Now the reconstructed word is again encrypted $m'_1{}^e = e^k(m'_1)$, and the Hamming distance of $m'_1{}^e$ from the data word $v_1$ which was originally read from the memory is calculated:

$$d_1 d(m'_1{}^e, v_1) = d(m'_1{}^e, u_1{}^e + e_1) = d(m'_1{}^e, m_1{}^e + e_1) = 1.$$

5. Correcting the error

Because of $d_1 = 1$, it is now known that the 1-bit error was located in the second data word, and eventually one can write the corrected word $m'_1{}^e$ to the memory position of the $v_1$.

In the general case, the reconstruction of the data words is performed successively for $m_0, m_1, m_2, m_3, m_4$ in the substitution step 70. In the first occurrence of a Hamming distance of 1, the position of the error is determined, and the process is stopped. In the event that no Hamming distance of 1 can be found, an error has occurred wherein several bits have been altered at the same time, and an attack on the system is assumed.

The particular advantage of the inventive embodiment in which the ECC 160 code is modified is that the correction of flawed data may be executed at a higher processing speed, which is why the complexity of the hardware implementation shall be dealt with once again separately for the embodiment of the invention which has just been described.

At first sight, the implementation of equations 2 which describe the encrypted substituted data word vectors seems complicated because of the inverted matrices occurring therein.

The following is to illustrate that the implementation is not more expensive than the implementation of the calculation of the syndrome bit vector. The cyclic circulant matrices of rank 32, indicated in FIGS. 4a-4e, have the property of being self-inverse and of exhibiting three ones, respectively, in the column vectors constituting same. This means that the inverse of the matrices is not densely populated, i.e. results in a matrix with many ones, as one would normally expect for the inversion of a thinly populated matrix selected at random. For these matrices, the products $P_i \cdot P_j^{-1}$, $i \neq j$ are also thinly populated. In particular, the weight of the 5-band cyclic product matrices is 160 (for the original matrices Pi, the weight is 96).

All in all, there are six product matrices $P_i \cdot P_j^{-1}$, $i \neq j$, each product matrix having five bands, i.e. exhibiting a number of five ones in each row. Therefore, the complexity of the implementation in hardware is roughly $(6 \cdot \lceil \log_3(5) \rceil + 4 \cdot \lceil \log_3(3) \rceil) \cdot 32 = 512$ AND 3-Gates+4×32=128 XOR 3-Gates. The logic depth is 3.

A further improvement becomes possible when using matrices $P_i$ which are inverse in a pair-wise manner. In this case, there are only four matrix products, and one obtains a complexity of $(4 \cdot \lceil \log_3(5) \rceil + 4 \cdot \lceil \log_3(3) \rceil) \cdot 32 = 384$ AND 3-Gates+4×32=128 XOR 3-Gates. The logic depth is also 3. For the specific embodiment of the present invention, $P_0 = P_1^{-1}$ and $P_2 = P_3^{-1}$ are selected.

In order to implement an inventive apparatus for checking the integrity of data, other error codes are also possible, in principle, such as cyclic codes, specifically the BCH code and product codes.

Figure 5A:
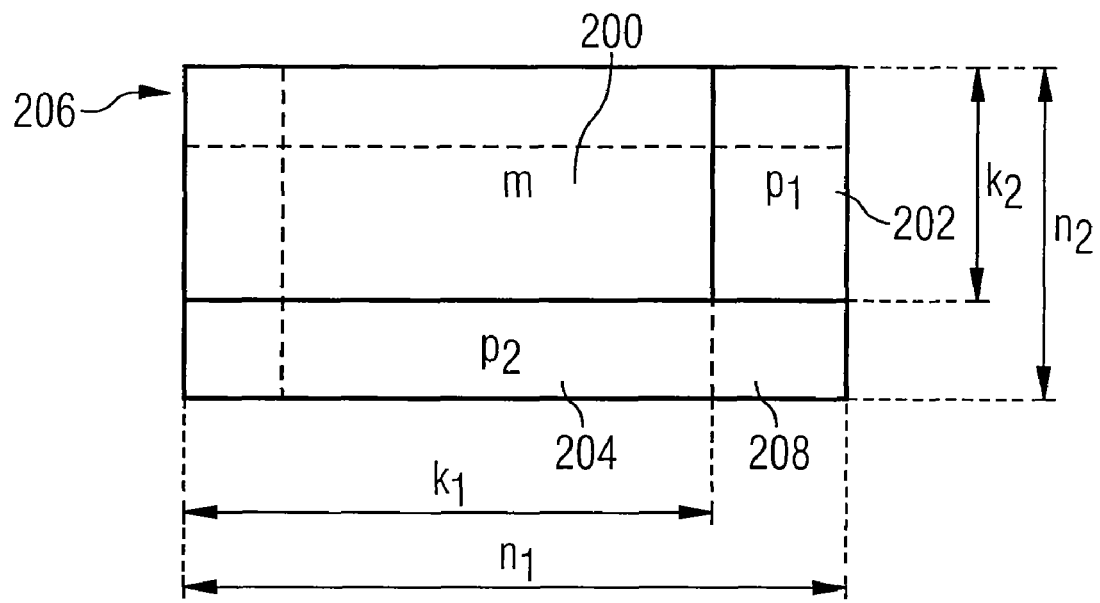
FIGS. 5a-b are a code field for generating a product code.
Figure 5B:
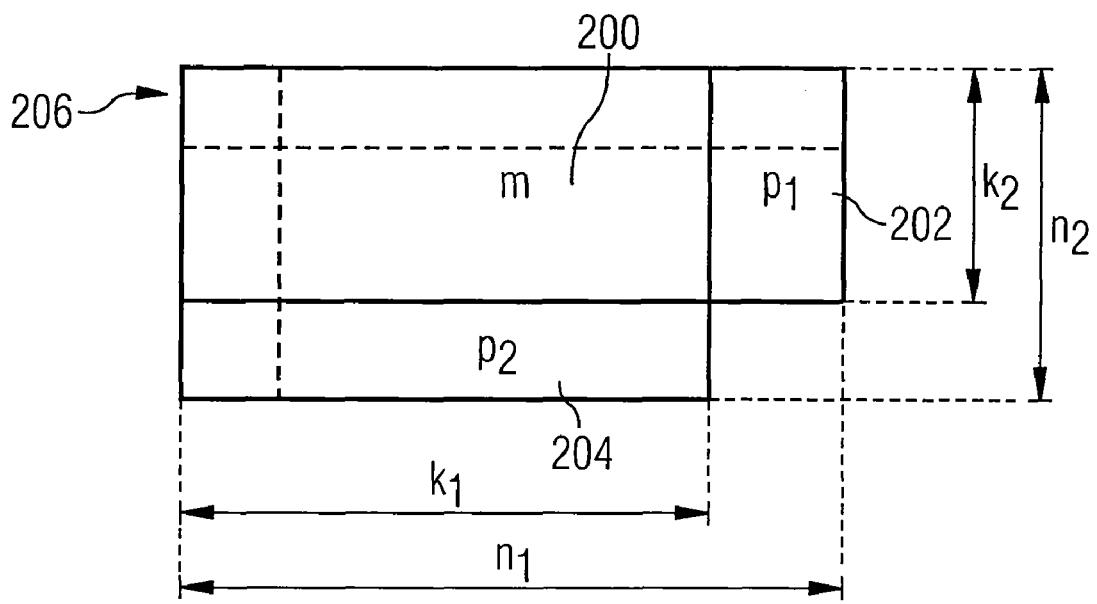

As far as product codes are concerned, powerful codes having larger Hamming distances may be formed from codes having smaller Hamming distances in that so-called product codes are generated. If $C_1$ is a linear $(n_1, k_1)$ code, and $C_2$ is a linear $(n_2, k_2)$ code, then a $(n_1 n_2, k_1 k_2)$ code may be formed, as is depicted in FIG. 5, the codes assumed here being systematic. FIG. 5 shows a data bit block 200 as well as first check bit vectors 202 and second check bit vectors 204. A number k1 of data words of a length of k2 are arranged, in the data bit block 200, such that one data word forms one row of the data bit block m, respectively, and that the $k_1$ different data words are arranged one underneath the other within the data bit block 200, as may be seen in FIG. 5 by means of the schematically depicted data word 206. Two linear codes $C_1$ and $C_2$ are applied to data block 200 in such a manner that each row is a code word of a length of $n_1$ in $C_1$, and such that each column is a code word of a length of $n_2$ in $C_2$. The rectangular control area 208 in FIG. 5*a* includes the check bits which result in $C_1$ being applied to the check bits of $C_2$, and vice versa. The minimum Hamming distance of such a product code is $$d_{min} = d_{min}^{(1)} \cdot d_{min}^{(2)},$$

the code is thus able to correct $$t = \lfloor (d_{min}^{(1)} \cdot d_{min}^{(2)} - 1)/2 \rfloor$$

errors. A variation of a product code is the so-called incomplete product code, as is shown in FIG. 5*b*. FIG. 5*b* differs from FIG. 5*a* in that the control area 208 is omitted, the resulting $(k_1n_2+k_2n_1-k_1k_2, k_1k_2)$ linear product code is weaker and has a minimum Hamming distance of only $d_{min} = d_{min}^{(1)} + d_{min}^{(2)} - 1$.

An incomplete product code is also referred to as a linear sum code.

The incomplete product code of two single parity codes (SPC) is widely used in industrial RAM designs and in microprocessors, for example in designing the registers. These codes are also frequently referred to as horizontal and vertical parity codes. If the complete product code of two SPCs is formed, the minimum Hamming distance is $d_{min}=4$.

Different DRAM designs may be used as examples for implementing incomplete product codes. As an expansion by a cross parity, mention shall also be made of the SUN Sparc Register File.

In our specific case, two linear codes having a plurality of control bits would be necessary to meet the high demands placed upon the code with regard to non-discovery of an error. Since the data block size of 128 or 256 bits is relatively small, such a code would produce significant overhead. To illustrate this, a data block size k=256 shall be assumed below. Data block 200 is arranged in a field of eight rows and 32 columns (i.e. 32-bits words). The smallest linear block code for a 32-bits data word which allows a Hamming distance of $d_{min} \geq 3$ while taking into account the Hamming limit $$n - k \geq \log_2 \sum_{i=0}^{t} \binom{n}{i},$$

is a linear (38, 32) code. It can be shown that the smallest possible Hsiao code is a (39, 32) code. If the (39, 32) Hsiao code applied to the rows is combined with a (9, 8) SPC code applied to the columns, one obtains a (351, 256) product code. This code is characterized by $d_{min}=4\cdot2=8$ and r=73%, the probability of an undetected error is in the order of $P_u \approx 2^{n-k} = 2^{-95}$.

The parity check matrix for the (39, 32) Hsiao code is:

$$H = \begin{pmatrix} 10000110 & 01001101 & 00011000 & 10110010 & 1000000 \\ 11000011 & 00100110 & 10001100 & 01011001 & 0100000 \\ 11100001 & 10010011 & 01000110 & 00100100 & 0010000 \\ 01110000 & 11001001 & 10100011 & 00011010 & 0001000 \\ 00111000 & 01100100 & 11010101 & 10000101 & 0000100 \\ 00011101 & 00110000 & 01101010 & 11001010 & 0000010 \\ 00001110 & 10011010 & 00110001 & 01100101 & 0000001 \end{pmatrix}$$

Such product codes are not suitable for the desired efficient hardware implementation, since at r=73%, they exhibit significant overhead.

As a further possibility of implementing a code into an apparatus for verifying the integrity of data, BCH codes will be briefly described below.

A BCH code having a small probability of an undetected error is formed by the generator polynomial which is the product of three primitive polynomials $$p(x) = x^{27} + x^{26} + x^{24} + x^{22} + x^{21} + x^{16} + x^{13} + x^{11} + x^9 + x^8 + x^6 + x^5 x^4 + x^3 + 1,$$

which is the product of three primitive polynomials $$p_1(x) = x^9 + x^6 + x^4 + x^3 + 1,$$

$$p_2(x) = x^9 + x^8 + x^5 + x^4 + 1,$$

$$p_3(x) = x^9 + x^4 + 1.$$

This code has the minimum Hamming distance $d_{min}=7$, the length n=511, the dimension k=484 and m=n−k=27 check bits. For the probability of an undetected error, $p_u \leq 2^{27}$ may be indicated as the upper limit. BCH codes have cyclic structures. This property is not required for fast execution of the error verification, it being possible to implement the encoding and the generating of the syndrome as a linear shift register. If a fast, fully parallel implementation in a circuit is required, this circuit would be very large, since the resulting parity check matrix would exhibit, in a systematic form, about 50% of ones. The shift-register implementation additionally has the disadvantage that the required Delta property of the code becomes possible only by means of considerable additional hardware expense, which generally applies to all cyclic codes. Therefore, this code is not suitable for the inventive efficient and fast hardware implementation.

The advantage of the embodiments of the present invention is therefore that a linear code for protection against fault attacks is defined and/or realized by a specially designed control matrix. Said control matrix is constructed from idempotent thinly populated circulant square sub-matrices. Thinly populated means that the matrices contain few ones, and contain mainly zeros. In the hardware implementation of the code, this corresponds to a small silicon area, and, in operation, to low current consumption.

Circulant matrices are square matrices which are already unambiguously defined by their first row. The following rows result from shifting this first row in a cyclic manner. By constructing the control matrix from circulant matrices only, one achieves, in particular, that each row of the control matrix has an equal number of ones.

This means that in calculating the individual bits of the control word or of the syndrome, the same gate depth may be passed, respectively. This is important for efficient hardware implementation. A square matrix is referred to as idempotent when it is invertible and when the inverse matrix is identical with the original matrix (the matrix is "self-inverse"). The idempotency of the used sub-matrices of the inventive code allows reconstructing, in a hardware-efficient manner, a flawed word from the data block from the other (flawless) words plus the control word. This property is needed to be able to correct 1-bit errors (so-called moving bit errors), as occur from time to time in the EEPROM.

Specifically, when reading out from the EEPROM, such a 1-bit error in a stored value is decrypted. The decryption device has a so-called avalanche effect: when encrypting or decrypting a 32-bits word, a 1-bit error turns to a multi-bit error (typically 10-20 bit errors). After the readout, the linear code is employed. The syndrome is different from 0—an indication that either a fault attack has occurred or that a moving bit error has occurred in the memory. Now the flawed word must be reconstructed from the other (flawless) words of the decrypted data block. As a specific embodiment of the inventive code class, a linear code of a length of 160 was described in detail, in the preceding paragraphs, for a word width of 32, this code being referred to as ECC 160.

Even though in the embodiment of the present invention, depicted in FIG. 1, redundancy means 12 and control means 14 are directly integrated into the processor and/or the calculating unit 10, redundancy means 12 and control means 14 may be arranged, in accordance with the invention, at any position along the data path upstream from the encryption/decryption means 20. The inventive redundancy means 12 and the control means 14 may be flexibly mounted at a position in the data path which is determined by the scope of protection desired. If one wants to protect, for example, only the transfer to the mass memory, redundancy means 12 and control means 14 may be arranged between cache 16 and encryption/decryption means 20; if the cache is also to be monitored, a placement between data register 6 and cache 16 may readily be implemented.

Depending on the circumstances, the inventive method for protecting the integrity of data may be implemented in hardware or in software. The implementation may be conducted on a digital storage medium, in particular a disc or CD with electronically readable control signals, which may cooperate with a programmable computer system such that the inventive method for protecting the integrity of data is performed.

Generally, the invention thus also consists in a computer program product having a program code, stored on a machine-readable carrier, for performing the inventive method, when the computer program product runs on a computer. In other words, the invention may thus also be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for protecting the integrity of data, comprising:
a redundancy generator configured to form a data bit vector from a plurality of data words of a data block, and to generate a control bit vector by multiplying the data bit vector by a binary generator matrix consisting of square, circulant sub-matrices;
an encryptor/decryptor configured to encrypt each of the data words to obtain encrypted data words, and to encrypt the control bit vector to obtain an encrypted control bit vector, and to decrypt each of the encrypted data words to obtain decrypted data words, and to decrypt the encrypted control bit vector to obtain a decrypted control bit vector; and
a controller configured to form an overall bit vector from the decrypted data words or from the decrypted data words and the decrypted control bit vector, and to create a syndrome bit vector by multiplying a binary control matrix consisting of square, circulant sub-matrices by the overall bit vector, so that the integrity of the overall bit vector is verifiable using the syndrome bit vector, which additionally comprises a syndrome bit vector monitor configured to count zeros of the syndrome bit vector to trigger an alarm action when a number of zeros is higher than a predetermined threshold,
wherein at least one of the redundancy generator, the encryptor/decryptor and the controller comprises a hardware implementation.

2. The apparatus as claimed in claim 1, wherein the redundancy generator is configured such that the sub-matrices the generator matrix consists of are idempotent.

3. The apparatus as claimed in claim 1, wherein the redundancy generator is configured to use, as the generator matrix, a matrix comprising x square circulant sub-matrices, and to form the data bit vector from x data words, and wherein the controller is configured to use, as the control matrix, a matrix either consisting of x square circulant sub-matrices or x square circulant sub-matrices along with an identity matrix, and to form the overall bit vector from x decrypted data words or from x decrypted data words and the decrypted control bit vector, wherein x is equal to 2, 4, 8 or 16.

4. The apparatus as claimed in claim 3, wherein the redundancy generator is configured to use a generator matrix of which are inverse to one another in a pair-wise manner, and wherein the controller is configured to use a control matrix the sub-matrices of which are inverse to one another in a pair-wise manner.

5. The apparatus as claimed in claim 3, wherein the redundancy generator is configured to use data words of the length of 32 bits and a generator matrix comprising 4 square 32×32 matrices as the sub-matrices, and wherein the controller is configured to use data words of the length of 32 bits and a control matrix comprising 4 square 32×32 matrices as the sub-matrices.

6. The apparatus as claimed in claim 1, wherein the syndrome bit vector monitor is configured to perform the following steps in the alarm action:
generating new data words from the decrypted data words;
encrypting the new data words to obtain encrypted new data words;
comparing the encrypted new data words with the encrypted data words; and
triggering an attack alarm when the step of comparing establishes a deviation by more than one bit for each pair of encrypted data word and encrypted new data word, or enabling the new data words when the step of comparing establishes a deviation by one bit for a pair of encrypted data word and encrypted new data word.

7. An apparatus for protecting the integrity of data, comprising:
a decryptor configured to decrypt encrypted data words to obtain decrypted data words, and to decrypt an encrypted control bit vector to obtain a decrypted control bit vector; and
a controller configured to form an overall bit vector from the decrypted data words or from the decrypted data words and the decrypted control bit vector, and to create a syndrome bit vector by multiplying a binary control matrix consisting of square, circulant sub-matrices by the overall bit vector, so that the integrity of the overall bit vector is verifiable using the syndrome bit vector, wherein the sub-matrices the binary control matrix consists of are either idempotent or pair-wise inverse to each other,
wherein the binary control matrix is a n x (n*k) matrix and the sub-matrices of the binary control matrix are n×n matrices,
wherein at least one of the decryptor and the controller comprises a hardware implementation.

8. The apparatus as claimed in claim 1, wherein the controller is configured such that the binary control matrix is configured such that the syndrome bit vector corresponds to a linear combination of column vectors with the bits of the decrypted data words as coefficients plus the decrypted control bit vector, wherein
  each column vector exhibits an odd-numbered Hamming weight; and
  all column vectors exhibit the same Hamming weight.

9. An apparatus for protecting the integrity of data, comprising:
  a redundancy generator configured to form a data bit vector from a plurality of data words of a data block, and to generate a control bit vector by multiplying the data bit vector by a binary generator matrix consisting of square, circulant sub-matrices; and
  an encryptor configured to encrypt each of the data words to obtain encrypted data words, and to encrypt the control bit vector to obtain an encrypted control bit vector, wherein the binary generator matrix is a (n*(k−1))×(n*k) matrix with the sub-matrices of the binary generator matrix comprising k−1 n×n matrices and a (n*(k−1))×(n*(k−1)) identity matrix, wherein at least one of the redundancy generator and the encryptor comprises a hardware implementation.

10. An apparatus for protecting the integrity of data, comprising:
  a redundancy generator configured to form a data bit vector from a plurality of data words of a data block, and to generate a control bit vector by multiplying the data bit vector by a binary generator matrix comprising square, circulant sub-matrices;
  an encryptor/decryptor configured to encrypt each of the data words to obtain encrypted data words, and to encrypt the control bit vector to obtain an encrypted control bit vector, and to decrypt each of the encrypted data words to obtain decrypted data words, and to decrypt the encrypted control bit vector to obtain a decrypted control bit vector;
  a controller configured to form an overall bit vector from the decrypted data words or from the decrypted data words and the decrypted control bit vector, and to create a syndrome bit vector by multiplying a binary control matrix consisting of square, circulant sub-matrices by the overall bit vector, so that the integrity of the overall bit vector is verifiable using the syndrome bit vector,
  wherein the redundancy generator is configured to generate, in a following data bit vector which differs from the data bit vector by one difference vector, a difference control bit word by multiplying the difference vector by the generator matrix, and to form a following control bit word from the sum of the control bit word and the difference control bit word,
  wherein the binary control matrix is a n×(n*k) matrix and the sub-matrices of the binary control matrix are n×n matrices,
  wherein at least one of the redundancy generator, the encryptor/decryptor and the controller comprises a hardware implementation.

11. An apparatus for protecting the integrity of data, comprising:
  a redundancy generator configured to form a data bit vector from a plurality of data words of a data block, and to generate a control bit vector by multiplying the data bit vector by a binary generator matrix consisting of square, circulant sub-matrices;
  an encryptor to encrypt each of the data words to obtain encrypted data words, and to encrypt the control bit vector to obtain an encrypted control bit vector,
  wherein the redundancy generator is configured to generate, in a following data bit vector which differs from the data bit vector by one difference vector, a difference control bit word by multiplying the difference vector by the generator matrix, and to form a following control bit word from the sum of the control bit word and the difference control bit word,
    wherein the binary generator matrix is a (n*(k−1))×(n*k) matrix with the sub-matrices the binary generator matrix comprising k−1 n×n matrices and a (n*(k−1))×(n*(k−1)) identity matrix,
  wherein at least one of the redundancy generator and the encryptor comprises a hardware implementation.

12. A method for protecting the integrity of data, comprising:
  decrypting encrypted data words using a decryptor to obtain decrypted data words, and decrypting an encrypted control bit vector to obtain a decrypted control bit vector;
  forming an overall bit vector from the decrypted data words and the decrypted control bit vector;
  multiplying a binary control matrix consisting of square, circulant sub-matrices by the overall bit vector to create a syndrome bit vector using a controller, so that the integrity of the data words is verifiable using the syndrome bit vector, wherein the sub-matrices the binary control matrix consists of are either idempotent or pairwise inverse to each other; and counting zeros of the syndrome bit vector using the controller to trigger an alarm action when a number of zeros is higher than a predetermined threshold,
  wherein at least one of the decryptor and the controller comprises a hardware implementation.

13. A method for protecting the integrity of data, comprising:
  forming a data bit vector from a plurality of data words of a data block;
  multiplying the data bit vector by a binary generator matrix consisting of square, circulant sub-matrices using a controller to generate a control bit vector; and encrypting each of the data words using an encryptor to obtain encrypted data words, and encrypting the control bit vector to obtain an encrypted control bit vector;
    wherein the binary generator matrix is a (n*(k−1))×(n*k) matrix with the sub-matrices of the binary generator matrix comprising k−1 n×n matrices and a (n*(k−1))×(n*(k−1)) identity matrix,
  wherein at least one of the encryptor and the controller comprises a hardware implementation.

14. A non-transitory computer readable storage access medium having stored thereon a computer program having a program code for performing a method for protecting the integrity of data, the method comprising:
  decrypting encrypted data words to obtain decrypted data words, and decrypting an encrypted control bit vector to obtain a decrypted control bit vector;
  forming an overall bit vector from the decrypted data words and the decrypted control bit vector;
  multiplying a binary control matrix consisting of square, circulant sub-matrices by the overall bit vector to create a syndrome bit vector, so that the integrity of the data words is verifiable using the syndrome bit vector; and counting zeros of the syndrome bit vector to trigger an alarm action when a number of zeros is higher than a predetermined threshold, wherein the sub-matrices the binary control matrix consists of are either idempotent or pair-wise inverse to each other, when the program runs on a computer.

15. A non-transitory computer readable storage medium having stored thereon a computer program having a program code for performing a method for protecting the integrity of data, the method comprising:

forming a data bit vector from a plurality of data words of a data block;

multiplying the data bit vector by a binary generator matrix consisting of square, circulant sub-matrices to generate a control bit vector; and encrypting each of the data words to obtain encrypted data words, and encrypting the control bit vector to obtain an encrypted control bit vector, when the program runs on a computer, wherein the binary generator matrix is a $(n*(k-1))\times(n*k)$ matrix with the sub-matrices of the binary generator matrix comprising k−1 n×n matrices and a $(n*(k-1))\times(n*(k-1))$ identity matrix.

16. The apparatus as claimed in claim 1, wherein the controller is configured such that the sub-matrices the binary control matrix consists of, are idempotent.

17. The apparatus as claimed in claim 1, wherein the encryptor/decryptor is configured to perform the encryption/decryption separately for each of the data words.

18. An apparatus for protecting the integrity of data, comprising:

a redundancy generator configured to form a data bit vector from a plurality of data words of a data block, and to generate a control bit vector by multiplying the data bit vector by a binary generator matrix consisting of square, circulant sub-matrices;

an encryptor/decryptor configured to encrypt each of the data words to obtain encrypted data words, and to encrypt the control bit vector to obtain an encrypted control bit vector, and to decrypt each of the encrypted data words to obtain decrypted data words, and to decrypt the encrypted control bit vector to obtain a decrypted control bit vector; and a controller configured to form an overall bit vector from the decrypted data words or from the decrypted data words and the decrypted control bit vector, and to create a syndrome bit vector by multiplying a binary control matrix consisting of square, circulant sub-matrices by the overall bit vector, so that the integrity of the overall bit vector is verifiable using the syndrome bit vector, wherein the encryptor/decryptor is configured to perform the encryption/decryption separately for each of the data words, wherein the controller is configured to use, as the control matrix, a matrix either consisting of x square circulant sub-matrices or x square circulant sub-matrices along with an identity matrix, and to form the overall bit vector from x decrypted data words or from x decrypted data words and the decrypted control bit vector, wherein x is equal to 2, 4, 8, or 16, wherein at least one of the redundancy generator, the encryptor/decryptor and the controller comprises a hardware implementation.

19. The apparatus as claimed in claim 18, wherein the controller is configured to use a control matrix the sub-matrices of which are inverse to one another in a pair-wise manner.

20. The apparatus as claimed in claim 9, wherein the redundancy generator is configured such that all the sub-matrices the binary generator matrix comprises, are idempotent.

21. The apparatus as claimed in claim 9, wherein the redundancy generator is configured to use, as the generator matrix, a matrix comprising x square circulant sub-matrices, and to form the data bit vector from x data words data words, wherein x is equal to 2, 4, 8 or 16.

22. The apparatus as claimed in claim 21, wherein the redundancy generator is configured to use a generator matrix all the sub-matrices of which are inverse to one another in a pair-wise manner.

23. The apparatus as claimed in claim 21, wherein the redundancy generator is configured to use data words of the length of 32 bits and a generator matrix comprising 4 square 32×32 matrices as the sub-matrices.

24. An apparatus for protecting the integrity of data, comprising:

a redundancy generator configured to form a data bit vector from a plurality of data words of a data block, and to generate a control bit vector by multiplying the data bit vector by a binary generator matrix consisting of square, circulant sub-matrices;

an encryptor/decryptor configured to encrypt each of the data words to obtain encrypted data words, and to encrypt the control bit vector to obtain an encrypted control bit vector, and to decrypt each of the encrypted data words to obtain decrypted data words, and to decrypt the encrypted control bit vector to obtain a decrypted control bit vector; and a controller configured to form an overall bit vector from the decrypted data words or from the decrypted data words and the decrypted control bit vector, and to create a syndrome bit vector by multiplying a binary control matrix consisting of square, circulant sub-matrices by the overall bit vector, so that the integrity of the overall bit vector is verifiable using the syndrome bit vector, wherein the binary control matrix is a $n\times(n*k)$ matrix and the sub-matrices of the binary control matrix are n×n matrices, wherein at least one of the redundancy generator, the encryptor/decryptor and the controller comprises a hardware implementation.

\* \* \* \* \*

UNITED STATES PATENT AND TRADEMARK OFFICE
CERTIFICATE OF CORRECTION

PATENT NO. : 8,250,659 B2  
APPLICATION NO. : 11/425103  
DATED : August 21, 2012  
INVENTOR(S) : Berndt Gammel et al.

Page 1 of 1

It is certified that error appears in the above-identified patent and that said Letters Patent is hereby corrected as shown below:

In the Title page

In section (56) REFERENCES CITED, under U.S. PATENT DOCUMENTS, please insert -- US 6,757,122 --, -- US 2002/0196938 A1 --, and -- US 2006/0179395 A1 --, therefor.

In section (56) REFERENCES CITED, under FOREIGN PATENT DOCUMENTS, please insert -- JP 2003-316652 BA --, -- DE 102005001953.6 BB --, -- FR 2880962 A --, -- EP 0605047 A1 --, and -- JP 2002077135 A --, therefor.

Signed and Sealed this  
Twentieth Day of November, 2012

David J. Kappos  
*Director of the United States Patent and Trademark Office*